United States Patent
Thayalarajan et al.

(10) Patent No.: US 12,466,900 B2
(45) Date of Patent: Nov. 11, 2025

(54) LOOP SLURRY PERIODOGRAM CONTROL TO PREVENT REACTOR FOULING AND REACTOR SHUTDOWNS

(71) Applicant: Chevron Phillips Chemical Company LP, The Woodlands, TX (US)

(72) Inventors: Aloysius V. Thayalarajan, Richmond, TX (US); Joseph A. Curren, Houston, TX (US); Roman Walther, Katy, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 714 days.

(21) Appl. No.: 17/723,661

(22) Filed: Apr. 19, 2022

(65) Prior Publication Data
US 2023/0331875 A1    Oct. 19, 2023

(51) Int. Cl.
*C08F 2/00* (2006.01)
*B01J 19/00* (2006.01)
(Continued)

(52) U.S. Cl.
CPC ............. *C08F 2/002* (2013.01); *C08F 2/01* (2013.01)

(58) Field of Classification Search
CPC .......... C08F 2/002; C08F 2/01; B01J 19/0006; B01J 19/2435
See application file for complete search history.

(56) References Cited

U.S. PATENT DOCUMENTS

| | | | |
|---|---|---|---|
| 2,825,721 A | 3/1958 | Hogan | |
| 3,225,023 A | 12/1965 | Hogan | |

(Continued)

FOREIGN PATENT DOCUMENTS

| | | |
|---|---|---|
| EP | 0432555 A2 | 6/1991 |
| EP | 1563903 A1 | 8/2005 |

OTHER PUBLICATIONS

IUPAC Compendium of Chemical Terminology, 2nd Ed. 1997, pp. 1-1670.

(Continued)

*Primary Examiner* — Catherine S Branch
(74) *Attorney, Agent, or Firm* — Merchant & Gould P.C.

(57) ABSTRACT

Methods for operating a polymerization reactor system are described, and these methods include the steps of contacting a transition metal-based catalyst system with an olefin monomer and an optional olefin comonomer in the polymerization reactor system comprising a loop slurry reactor and a reactor circulating pump under polymerization conditions to produce an olefin polymer; measuring a kW power consumption of the reactor circulating pump to generate power consumption versus time data; converting the power consumption versus time data using frequency analysis to generate intensity versus frequency data at a first frequency interval encompassing a time equal to one-half an average recirculation period in the loop slurry reactor, and intensity versus frequency data at a second frequency interval encompassing a time equal to the average full recirculation period in the loop slurry reactor; and reducing a production rate of the olefin polymer in the loop slurry reactor when a total of a first peak intensity at the first frequency interval and a second peak intensity at the second frequency interval is equal to 10,000 or more, or when the rate of change of the first peak intensity or the rate of change of the second peak intensity is equal to 5,000/hr or more.

25 Claims, 13 Drawing Sheets

(51) Int. Cl.
*B01J 19/24* (2006.01)
*C08F 2/01* (2006.01)

(56) References Cited

U.S. PATENT DOCUMENTS

| | | |
|---|---|---|
| 3,226,205 A | 12/1965 | Rohlfing |
| 3,242,099 A | 3/1966 | Manyik |
| 3,248,179 A | 4/1966 | Norwood |
| 3,622,521 A | 11/1971 | Hogan |
| 3,625,864 A | 12/1971 | Horvath |
| 3,887,494 A | 6/1975 | Dietz |
| 3,900,457 A | 8/1975 | Witt |
| 3,976,632 A | 8/1976 | Delap |
| 4,053,436 A | 10/1977 | Hogan |
| 4,081,407 A | 3/1978 | Short |
| 4,151,122 A | 4/1979 | McDaniel |
| 4,182,815 A | 1/1980 | McDaniel |
| 4,247,421 A | 1/1981 | McDaniel |
| 4,248,735 A | 2/1981 | McDaniel |
| 4,296,001 A | 10/1981 | Hawley |
| 4,297,460 A | 10/1981 | McDaniel |
| 4,301,034 A | 11/1981 | McDaniel |
| 4,339,559 A | 7/1982 | McDaniel |
| 4,364,842 A | 12/1982 | McDaniel |
| 4,364,854 A | 12/1982 | McDaniel |
| 4,364,855 A | 12/1982 | McDaniel |
| 4,392,990 A | 7/1983 | Witt |
| 4,397,766 A | 8/1983 | Hawley |
| 4,397,769 A | 8/1983 | McDaniel |
| 4,405,501 A | 9/1983 | Witt |
| 4,444,962 A | 4/1984 | McDaniel |
| 4,444,964 A | 4/1984 | McDaniel |
| 4,444,965 A | 4/1984 | McDaniels |
| 4,460,756 A | 7/1984 | McDaniel |
| 4,501,885 A | 2/1985 | Sherk |
| 4,504,638 A | 3/1985 | McDaniel |
| 4,547,557 A | 10/1985 | McDaniel |
| 4,735,931 A | 4/1988 | McDaniel |
| 4,806,513 A | 2/1989 | McDaniel |
| 4,808,561 A | 2/1989 | Welborn, Jr. |
| 4,820,785 A | 4/1989 | McDaniel |
| 4,855,271 A | 8/1989 | McDaniel |
| 4,939,217 A | 7/1990 | Stricklen |
| 4,981,831 A | 1/1991 | Knudsen |
| 4,988,657 A | 1/1991 | Martin |
| 5,037,911 A | 8/1991 | McDaniel |
| 5,179,178 A | 1/1993 | Stacy |
| 5,191,132 A | 3/1993 | Patsidis |
| 5,210,352 A | 5/1993 | Alt |
| 5,219,817 A | 6/1993 | McDaniel |
| 5,221,654 A | 6/1993 | McDaniel |
| 5,237,025 A | 8/1993 | Benham |
| 5,244,990 A | 9/1993 | Mitchell |
| 5,275,992 A | 1/1994 | Mitchell |
| 5,347,026 A | 9/1994 | Patsidis |
| 5,399,636 A | 3/1995 | Alt |
| 5,401,817 A | 3/1995 | Palackal |
| 5,420,320 A | 5/1995 | Zenk |
| 5,436,305 A | 7/1995 | Alt |
| 5,451,649 A | 9/1995 | Zenk |
| 5,480,848 A | 1/1996 | Geerts |
| 5,496,781 A | 3/1996 | Geerts |
| 5,498,581 A | 3/1996 | Welch |
| 5,541,272 A | 7/1996 | Schmid |
| 5,554,795 A | 9/1996 | Frey |
| 5,563,284 A | 10/1996 | Frey |
| 5,565,175 A | 10/1996 | Hottovy |
| 5,565,592 A | 10/1996 | Patsidis |
| 5,571,880 A | 11/1996 | Alt |
| 5,575,979 A | 11/1996 | Hanson |
| 5,594,078 A | 1/1997 | Welch |
| 5,610,247 A | 3/1997 | Alt |
| 5,627,247 A | 5/1997 | Alt |
| 5,631,203 A | 5/1997 | Welch |
| 5,631,335 A | 5/1997 | Alt |
| 5,654,454 A | 8/1997 | Peifer |
| 5,668,230 A | 9/1997 | Schertl |
| 5,705,579 A | 1/1998 | Hawley |
| 6,107,230 A | 8/2000 | McDaniel |
| 6,165,929 A | 12/2000 | McDaniel |
| 6,239,235 B1 | 5/2001 | Hottovy |
| 6,262,191 B1 | 7/2001 | Hottovy |
| 6,294,494 B1 | 9/2001 | McDaniel |
| 6,300,271 B1 | 10/2001 | McDaniel |
| 6,316,553 B1 | 11/2001 | McDaniel |
| 6,355,594 B1 | 3/2002 | McDaniel |
| 6,376,415 B1 | 4/2002 | McDaniel |
| 6,388,017 B1 | 5/2002 | McDaniel |
| 6,391,816 B1 | 5/2002 | McDaniel |
| 6,395,666 B1 | 5/2002 | McDaniel |
| 6,524,987 B1 | 2/2003 | Collins |
| 6,548,441 B1 | 4/2003 | McDaniel |
| 6,548,442 B1 | 4/2003 | McDaniel |
| 6,576,583 B1 | 6/2003 | McDaniel |
| 6,613,712 B1 | 9/2003 | McDaniel |
| 6,632,894 B1 | 10/2003 | McDaniel |
| 6,653,416 B2 | 11/2003 | McDaniel |
| 6,667,274 B1 | 12/2003 | Hawley |
| 6,750,302 B1 | 6/2004 | McDaniel |
| 6,831,141 B2 | 12/2004 | McDaniel |
| 6,833,338 B2 | 12/2004 | McDaniel |
| 6,833,415 B2 | 12/2004 | Kendrick |
| 7,026,494 B1 | 4/2006 | Yang |
| 7,041,617 B2 | 5/2006 | Jensen |
| 7,199,073 B2 | 4/2007 | Martin |
| 7,226,886 B2 | 6/2007 | Jayaratne |
| 7,294,599 B2 | 11/2007 | Jensen |
| 7,312,283 B2 | 12/2007 | Martin |
| 7,329,712 B2 | 2/2008 | Fouarge |
| 7,417,097 B2 | 8/2008 | Yu |
| 7,517,939 B2 | 4/2009 | Yang |
| 7,601,665 B2 | 10/2009 | McDaniel |
| 7,619,047 B2 | 11/2009 | Yang |
| 7,645,841 B2 | 1/2010 | Shaw |
| 7,884,163 B2 | 2/2011 | McDaniel |
| 7,919,639 B2 | 4/2011 | Murray |
| 8,080,681 B2 | 12/2011 | Murray |
| 8,309,485 B2 | 11/2012 | Yang |
| 8,487,053 B2 | 7/2013 | Rajaendran |
| 8,623,973 B1 | 1/2014 | McDaniel |
| 8,703,886 B1 | 4/2014 | Yang |
| 8,822,608 B1 | 9/2014 | Bhandarkar |
| 10,029,230 B1 | 7/2018 | Kufeld |
| 2010/0130704 A1 | 5/2010 | Hottovy |

OTHER PUBLICATIONS

International Search Report and Written Opinion issued in corresponding PCT Application No. PCT/US2023/065565, mailed on Aug. 4, 2023, 9 pp.
Declaration of Aloysius V. Thayalarajan, Jul. 11, 2025, 2 pages.

LOOP SLURRY PERIODOGRAM CONTROL TO PREVENT REACTOR FOULING AND REACTOR SHUTDOWNS

FIELD OF THE INVENTION

The present disclosure concerns methods for operating a polymerization reactor system, and more particularly, relates to methods for preventing reactor fouling, process upsets, and reactor shutdowns due to periodic and non-random events in continuous olefin polymerization processes.

BACKGROUND OF THE INVENTION

Reactor shutdowns of large-scale commercial production operations of olefin-based polymers, such as ethylene-based homopolymers and copolymers, are avoided due to the associated and excessive costs, clean-up, and downtime. While many process upsets that lead to a reactor shutdown are random and unpredictable, other process upsets that can cause a reactor shutdown are due to a periodic and non-random variation with the reactor system.

It would be beneficial to develop new methods for addressing periodic variations that can lead to a reactor shutdown, and therefore enable corrective action to be taken such that a reactor shutdown is not necessary. Accordingly, it is to this end that the present invention is generally directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

Methods for operating a polymerization reactor system are disclosed herein. In accordance with an aspect of the present invention, one such method can comprise (i) contacting a transition metal-based catalyst system with an olefin monomer and an optional olefin comonomer in the polymerization reactor system comprising a loop slurry reactor and a reactor circulating pump under polymerization conditions to produce an olefin polymer, (ii) measuring a kW power consumption of the reactor circulating pump to generate power consumption versus time data, (iii) converting the power consumption versus time data using frequency analysis to generate (a) intensity versus frequency data at a first frequency interval encompassing a time equal to one-half an average recirculation period in the loop slurry reactor, and (b) intensity versus frequency data at a second frequency interval encompassing a time equal to the average full recirculation period in the loop slurry reactor, and (iv) reducing a production rate of the olefin polymer in the loop slurry reactor when a total of a first peak intensity at the first frequency interval and a second peak intensity at the second frequency interval is equal to 10,000 or more.

Another method for operating a polymerization reactor system consistent with an aspect of the present invention can comprise (i) contacting a transition metal-based catalyst system with an olefin monomer and an optional olefin comonomer in the polymerization reactor system comprising a loop slurry reactor and a reactor circulating pump under polymerization conditions to produce an olefin polymer, (ii) measuring a kW power consumption of the reactor circulating pump to generate power consumption versus time data, (iii) converting the power consumption versus time data using frequency analysis to generate (a) intensity versus frequency data at a first frequency interval encompassing a time equal to one-half an average recirculation period in the loop slurry reactor, and (b) intensity versus frequency data at a second frequency interval encompassing a time equal to the average full recirculation period in the loop slurry reactor, and (iv) reducing a production rate of the olefin polymer in the loop slurry reactor when a rate of change of at least one of a first peak intensity at the first frequency interval and/or a second peak intensity at the second frequency interval is equal to 5,000/hr or more.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects may be directed to various feature combinations and sub-combinations described in the detailed description.

BRIEF DESCRIPTION OF THE FIGURES

The following figures form part of the present specification and are included to further demonstrate certain aspects of the present invention. The invention may be better understood by reference to one or more of these figures in combination with the detailed description and examples.

Figure 1:
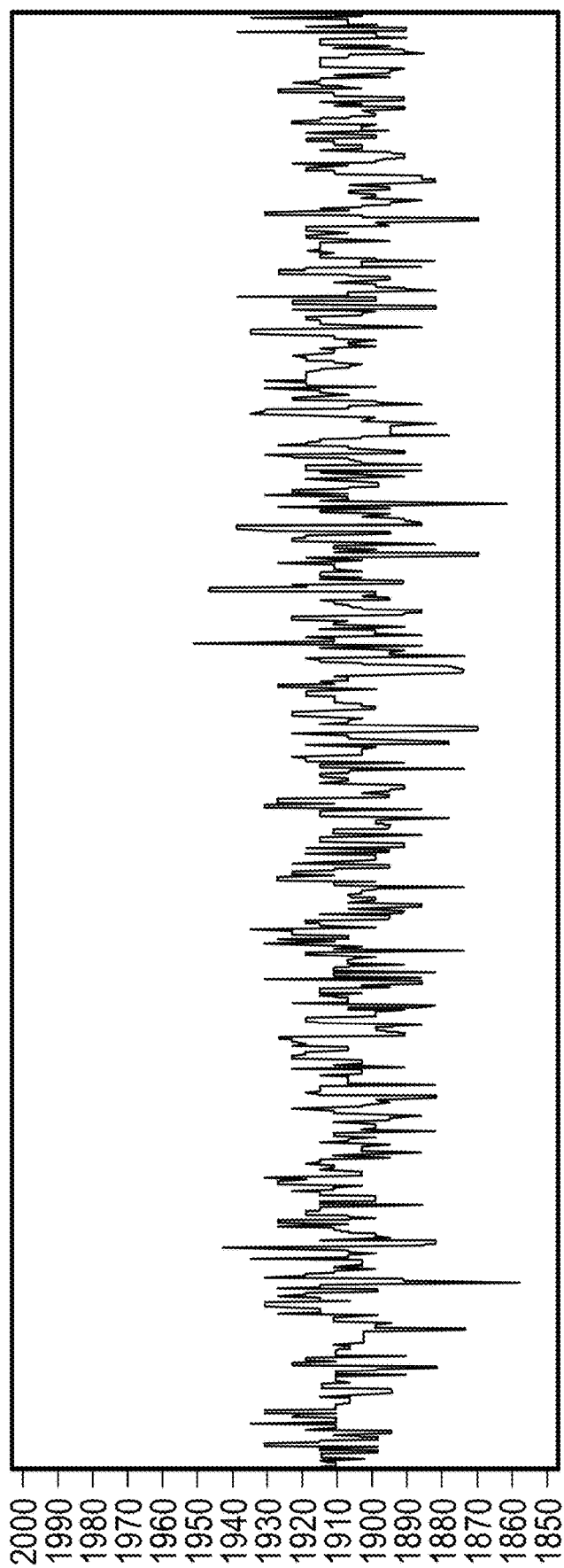
FIG. 1 presents a plot of power consumption (kW) over a 20-min time interval for a reactor circulating pump approximately 12 hr prior to a fouling event, as described in Example 1.

While the inventions disclosed herein are susceptible to various modifications and alternative forms, only a few specific aspects have been shown by way of example in the drawings and described in detail below. The figures and detailed descriptions of these specific aspects are not intended to limit the breadth or scope of the inventive concepts or the appended claims in any manner. Rather, the figures and detailed descriptions are provided to illustrate the inventive concepts to a person of ordinary skill in the art and to enable such person to make and use the inventive concepts.

Definitions

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and/or feature disclosed herein, all combinations that do not detrimentally affect the systems, compositions, processes, and/or methods described herein are contemplated with or without explicit description of the particular combination. Additionally, unless explicitly recited otherwise, any aspect and/or feature disclosed herein can be combined to describe inventive features consistent with the present disclosure.

In this disclosure, while methods are often described in terms of "comprising" various components, devices, or steps, the methods can also "consist essentially of" or "consist of" the various components, devices, or steps, unless stated otherwise. The terms "a," "an," and "the" are intended to include plural alternatives, e.g., at least one, unless otherwise specified.

For any particular compound or group disclosed herein, any name or structure (general or specific) presented is intended to encompass all conformational isomers, regioisomers, stereoisomers, and mixtures thereof that can arise from a particular set of substituents, unless otherwise specified. The name or structure (general or specific) also encompasses all enantiomers, diastereomers, and other optical isomers (if there are any) whether in enantiomeric or racemic forms, as well as mixtures of stereoisomers, as would be recognized by a skilled artisan, unless otherwise specified. For instance, a general reference to pentane includes n-pentane, 2-methyl-butane, and 2,2-dimethylpropane; and a general reference to a butyl group includes a n-butyl group, a sec-butyl group, an iso-butyl group, and a t-butyl group.

The term "contacting" is used herein to describe methods in which the components are contacted or combined together in any order, in any manner, and for any length of time, unless otherwise specified. For example, the components can be combined by blending or mixing, using any suitable technique.

The term "polymer" is used herein generically to include olefin homopolymers, copolymers, terpolymers, and the like, as well as alloys and blends thereof. The term "polymer" also includes impact, block, graft, random, and alternating copolymers. A copolymer can be derived from an olefin monomer and one olefin comonomer, while a terpolymer can be derived from an olefin monomer and two olefin comonomers. Accordingly, "polymer" encompasses copolymers and terpolymers. Similarly, the scope of the term "polymerization" includes homopolymerization, copolymerization, and terpolymerization. Therefore, an ethylene polymer includes ethylene homopolymers, ethylene copolymers (e.g., ethylene/α-olefin copolymers), ethylene terpolymers, and the like, as well as blends or mixtures thereof, and having any suitable density. Thus, an ethylene polymer encompasses polymers often referred to in the art as LLDPE (linear low density polyethylene) and HDPE (high density polyethylene). As an example, an ethylene copolymer can be derived from ethylene and a comonomer, such as 1-butene, 1-hexene, or 1-octene. If the monomer and comonomer were ethylene and 1-hexene, respectively, the resulting polymer can be categorized an as ethylene/1-hexene copolymer. The term "polymer" also includes all possible geometrical configurations, if present and unless stated otherwise, and such configurations can include isotactic, syndiotactic, and random symmetries. The term "polymer" also is meant to include all molecular weight polymers, and is inclusive of lower molecular weight polymers.

Several types of ranges are disclosed in the present invention. When a range of any type is disclosed or claimed, the intent is to disclose or claim individually each possible number that such a range could reasonably encompass, including end points of the range as well as any sub-ranges and combinations of sub-ranges encompassed therein. For example, the polymerization temperature in a loop slurry reactor can fall within different ranges in aspects of this invention. By a disclosure that the polymerization reaction temperature is a range from 60° C. to 185° C., the intent is to recite that the polymerization temperature can be any temperature in the range and, for example, can include any range or combinations of ranges from 60° C. to 185° C., such as from 60° C. to 115° C., from 75° C. to 115° C., or from 130° C. to 180° C., and so forth. Likewise, all other ranges disclosed herein should be interpreted in a manner similar to this example.

In general, an amount, size, formulation, parameter, range, or other quantity or characteristic is "about" or "approximately" whether or not expressly stated to be such. Whether or not modified by the term "about" or "approximately," the claims include equivalents to the quantities or characteristics.

Although any methods, components, devices, or steps similar or equivalent to those described herein can be used in the practice or testing of the invention, the typical methods, components, devices, or steps are herein described.

All publications and patents mentioned herein are incorporated herein by reference in their entirety for the purpose of describing and disclosing, for example, the constructs and methodologies that are described in the publications and patents, which might be used in connection with the presently described invention.

DETAILED DESCRIPTION OF THE INVENTION

As it relates to "fouling" in a loop slurry reactor, signs of the fouling event often are visible in advance in many of the reactor variables including the circulating pump power and the reaction temperature. During normal operation, it is typical for a certain amount of random variation to be present in the circulating pump power trend due to random localized solids concentration differences. These may arise from solids separating and concentrating because of centrifugal forces that are present in the various loop reactor elbows which force solids to the outer radius. The circulating pump responds to the locally higher density of these higher-solids-concentration regions by drawing more power. However, in certain circumstances, one or more larger-scale solids-rich zones can begin to form, and if these zones grow to sufficient size then loss of circulation and heat transfer can occur, leading to a reactor foul.

Because the loop reactor circulates at a constant and predictable velocity, these solids-rich zones produce periodic—non-random—variations in the circulating pump power trend as they cross through the impeller. The ideal flow pattern in the loop reactor is a reasonably uniform axial distribution, where the only "noise" in the circulating pump power trend is random noise from the small, local solids concentration fluctuations. If for whatever reason these local fluctuations begin to propagate into larger-scale axial segregation of solids, this should be universally considered a negative situation with respect to loop reactor stability and steps should immediately be taken to remedy the situation by corrective action, such as reducing solids concentration and lowering particle activity/temperature through lower monomer (e.g., ethylene) concentration. Generally, experienced operators are aware of this and therefore pay careful attention to the visual appearance of the reactor circulating pump trend, observing for the onset of the "wide-banding" that is characteristic of these solids-rich plugs periodically circulating through the pump at non-random time intervals.

One downside of a purely "visual" operator-driven approach is that it can sometimes be subjective. Periodic oscillations can be present in the circulating pump trend without significantly increasing the peak-to-trough distance, and so the bandwidth is not significantly increased, but the appearance is certainly different. The presence of non-random variation is always a bad sign for uniform circulation, but it is difficult to communicate an objective "action level" of pump power oscillations if the bandwidth is not significantly increasing. Alarms based on bandwidth can be implemented in a loop reactor system, but these appear to be insufficiently sensitive to provide enough warning in some circumstances, and without producing too many false positives to be useful in commercial operation. While bandwidth is undoubtedly a valuable part of a warning system, more data appears necessary to gain a complete picture.

Frequency analysis via Fourier transform or periodogram techniques is a useful tool for complementing the bandwidth alarm by detecting the presence of periodic variation. These techniques mathematically analyze signal-vs-time data series and produce a corresponding set of intensity-vs-frequency data. If there is a component of the signal-vs-time relationship that is substantially periodic (and not random), then the intensity-vs-frequency plot that is produced by the Fourier transform or periodogram analysis will then show a large intensity at this frequency (and potentially other integer multiples of this frequency depending on the shape of the periodic disturbance, e.g., sawtooth, square, sine, and so forth). Because of the geometry and velocity of many loop slurry reactors, only certain frequencies will be relevant and these generally correspond to (1) an average full reactor circulation time and (2) half of this time. Ordinarily, this is because solids segregation patterns in loop reactors tend to produce either one or two circulating solids-rich masses in the reactor. If there is predominantly one growing solids mass, then the circulating pump kW values will develop a primary high intensity peak at the "average full reactor circulation time," often with smaller secondary peak overtones at integer divisors of this circulation time. A second important way that solids can segregate and lead to a reactor foul is that two solids-rich masses can form, and these masses appear to orient themselves opposite one another in the reactor. Therefore, these circumstances will result in a primary high intensity peak at "one-half the average reactor circulation time."

A non-limiting objective of this invention, therefore, is to identify particular "action levels" for the peak intensities in these key frequency ranges. Systems can be put in place to continuously analyze the previous 30 min or so of the circulating pump trend with the output being two new trends of the two relevant peak intensities over time. If either of these trends hits a identified threshold "action level" by considering a total of both, or by considering a rate of change of one or both, then this will be considered as a strong objective indication of reactor instability that will elicit corrective action by the operator with the goal of preserving continuous operation without a full reactor shutdown. It is improper to ask operators to take aggressive correction action (e.g., drastically reducing production rate) without being provided with highly reliable objective data that gives enough advanced warning where adequate responses are actually possible, and does not lead to false positives and to providing corrective action to address a reactor situation when no action is actually needed.

Methods for Operating Polymerization Reactor Systems

Various methods for operating a polymerization reactor system are disclosed and described herein. A first method can comprise (or consist essentially of, or consist of) (i) contacting a transition metal-based catalyst system with an olefin monomer and an optional olefin comonomer in the polymerization reactor system comprising a loop slurry reactor and a reactor circulating pump under polymerization conditions to produce an olefin polymer, (ii) measuring a kW power consumption of the reactor circulating pump to generate power consumption versus time data, (iii) converting the power consumption versus time data using frequency analysis to generate (a) intensity versus frequency data at a first frequency interval encompassing a time equal to one-half an average recirculation period in the loop slurry reactor, and (b) intensity versus frequency data at a second frequency interval encompassing a time equal to the average full recirculation period in the loop slurry reactor, and (iv) reducing a production rate of the olefin polymer in the loop slurry reactor when a total of a first peak intensity at the first frequency interval and a second peak intensity at the second frequency interval is equal to 10,000 or more.

A second method for operating a polymerization reactor system consistent with an aspect of the present invention can comprise (or consist essentially of, or consist of) (i) contacting a transition metal-based catalyst system with an olefin monomer and an optional olefin comonomer in the polymerization reactor system comprising a loop slurry reactor and a reactor circulating pump under polymerization conditions to produce an olefin polymer, (ii) measuring a kW power consumption of the reactor circulating pump to generate power consumption versus time data, (iii) converting the power consumption versus time data using frequency analysis to generate (a) intensity versus frequency data at a first frequency interval encompassing a time equal to one-half an average recirculation period in the loop slurry reactor, and (b) intensity versus frequency data at a second frequency interval encompassing a time equal to the average full recirculation period in the loop slurry reactor, and (iv) reducing a production rate of the olefin polymer in the loop slurry reactor when a rate of change (also referred to herein as slope) of at least one of a first peak intensity at the first frequency interval and/or a second peak intensity at the second frequency interval is equal to 5,000/hr or more.

Generally, the features of the first and second methods disclosed herein (e.g., the catalyst system, the olefin monomer, the olefin comonomer, the olefin polymer, the loop slurry reactor, the reactor circulating pump, the polymerization conditions, the kW power consumption data, the intensity versus frequency data, the total of the peak intensities and the rate of change of intensities, among others) are independently described herein, and these features can be combined in any combination to further describe the disclosed methods. Moreover, other process steps can be conducted before, during, and/or after any of the steps listed in the disclosed methods, unless stated otherwise.

Herein, step (i) can be performed continuously or discontinuously. More often, step (i) is performed continuously such that olefin polymer is continuously produced in the loop reactor. Likewise, step (ii) can be performed continuously or discontinuously. Typically, the kW power consumption is monitored/measured continuously, although there is generally a sampling interval range (a range of time). Likewise, step (iii) can be performed continuously or discontinuously. Power consumption versus time data can be converted to intensity versus frequency data continuously, although generally a block of time or a time interval is typically selected for which the power versus time data is converted to intensity versus frequency data. In sum, any one or more of step (i), step (ii), and/or step (iii), in any combination, can be performed continuously.

In step (i), the transition metal-based catalyst system is contacted with the olefin monomer and the optional olefin comonomer in the polymerization reactor system comprising the loop slurry reactor and the reactor circulating pump under polymerization conditions to produce the olefin polymer. The polymerization reactor system comprises a loop slurry reactor, and in one aspect, the polymerization reactor system comprises a single loop slurry reactor, while in another aspect, the polymerization reactor system comprises two reactors (in series or parallel), and in yet another aspect, the polymerization reactor system comprises more than two reactors. Thus, the polymerization reactor system can comprise the loop slurry reactor which is being monitored (kW power consumption of the reactor circulating pump, intensity versus frequency data, etc.), and this can be the only reactor in the reactor system, or two or more reactors can be present in the reactor system. For instance, the polymerization reactor system can comprise the loop slurry reactor and one or more additional reactors selected from a gas-phase reactor, a solution reactor, a second loop slurry reactor, or any combination thereof.

Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, for instance, the loop slurry reactor and a second loop slurry reactor in series, a first loop slurry reactor and the loop slurry reactor in series, the loop slurry reactor and a fluidized bed gas phase reactor in series, or the loop slurry reactor and a second loop slurry reactor (or a first loop slurry reactor and the loop slurry reactor) and a fluidized bed gas phase reactor in series, and so forth. Accordingly, the present invention encompasses polymerization reactor systems comprising a single reactor, comprising two reactors, and comprising more than two reactors. Thus, the polymerization reactor system can comprise an individual loop slurry reactor, as well as multi-reactor combinations of the same of different types of reactors.

The polymerization reactor system can further comprise any combination of at least one raw material feed system, at least one feed system for catalyst or catalyst components, and/or at least one polymer recovery system. Suitable reactor systems can further comprise systems for feedstock purification, catalyst storage and preparation, extrusion, reactor cooling, polymer recovery, fractionation, recycle, storage, loadout, laboratory analysis, and process control. Depending upon the desired properties of the ethylene polymer, hydrogen can be added to the polymerization reactor system as needed (e.g., continuously, pulsed, etc.).

Polymerization conditions that can be controlled for efficiency and to provide desired polymer properties can include temperature, pressure, and the concentrations of various reactants. Polymerization temperature can affect catalyst productivity, polymer molecular weight, and molecular weight distribution. Various polymerization conditions can be held substantially constant, for example, for the production of a particular grade of the ethylene polymer.

In the loop slurry reactor, generally an olefin monomer (such as ethylene), an inert hydrocarbon diluent, a transition metal-based catalyst system, hydrogen (if used), and olefin comonomer (if used, such as 1-hexene) can be continuously fed into the loop slurry reactor where polymerization occurs under polymerization conditions, inclusive of slurry or supercritical polymerization conditions. A reactor effluent containing a suspension of polymer particles and the diluent, and unreacted monomer, can be continuously removed from the loop slurry reactor. In some aspects, the wt. % solids (based on reactor contents) in the loop reactor can range from 30 wt. % to 55 wt. %, or from 40 wt. % to 70 wt. %. In other aspects, the polymerization conditions include wt. % solids contents of less than 50 wt. %, less than 40 wt. %, or less than 30 wt. %, such as from 25 wt. % to 45 wt. %, or from 30 wt. % to 40 wt. %.

Suitable inert hydrocarbon diluents used in loop slurry reactor include, but are not limited to, propane, isobutane, n-butane, n-pentane, isopentane, neopentane, cyclohexane, n-hexane, heptane, cycloheptane, octane, and the like, as well as any combination thereof. If more than one loop slurry reactor is used to produce the olefin polymer, then the inert hydrocarbon diluent in one loop slurry reactor can be the same as or different from the other loop slurry reactor. The selection of the inert hydrocarbon diluent can be based on many factors including polymerization temperature and pressure, whether supercritical conditions are employed, and polymer dissolution, among others. In one aspect, for example, the inert hydrocarbon diluent comprises (or consists essentially of, or consists of) propane, while in another aspect, the inert hydrocarbon diluent comprises (or consists essentially of, or consists of) isobutane.

General information on loop slurry reactors and suitable polymerization conditions can be found, for example, in U.S. Pat. Nos. 3,248,179, 4,501,885, 5,565,175, 5,575,979, 6,239,235, 6,262,191, 6,833,415, and 8,822,608. Nonetheless, typical polymerization conditions (for both slurry or supercritical polymerization) include a polymerization reaction temperature that can range from 60° C. to 185° C., from 60° C. to 115° C., from 75° C. to 115° C., or from 130° C. to 180° C., and a polymerization reaction pressure in a range from 200 to 1500 psig, from 200 to 1000 psig, from 400 to 1200 psig, from 450 to 850 psig, or from 900 to 1100 psig, although the polymerization reaction temperatures and pressures are not limited solely to these representative ranges.

Additional polymerization conditions in the loop slurry reactor include an average residence time of from 10 to 90 min, with other suitable ranges for the average residence time including from 15 to 75 min and from 20 to 60 min. Linear velocities within the loop slurry reactor often are as low as 10 ft/sec and up to 60 ft/sec, with typical ranges including from 15 to 55 ft/sec and from 20 to 50 ft/sec, although not limited thereto.

In an aspect, the polymerization conditions in the loop slurry reactor encompass polymerization conditions in which the inert hydrocarbon diluent is a liquid in the loop reactor. For example, the polymerization temperature and pressure in the loop reactor can be below the critical point, or the polymerization temperature can be below the critical point and the pressure above the critical point. An illustrative inert hydrocarbon diluent used under such conditions is isobutane.

In another aspect, the polymerization conditions in the loop reactor encompass supercritical conditions in which both polymerization reaction temperature and the polymerization reaction pressure in the loop reactor are above the critical points. An illustrative inert hydrocarbon diluent used under such conditions is propane—often termed supercritical propane. Herein, supercritical conditions include temperature and pressure conditions in which the diluent such as propane is supercritical (termed supercritical propane, where the propane is present above its temperature and pressure critical points), as well as temperature and pressure conditions in which all reactor contents are supercritical (above the respective temperature and pressure critical points for the respective materials). The supercritical conditions (e.g., temperature and pressure) can be readily determined by a skilled artisan. For instance, conditions for supercritical propane include a pressure at or above ~618 psia and a temperature at or above 96° C. Thus, representative conditions for supercritical propane in the loop slurry reactor include polymerization temperatures in a range from 90° C. to 130° C., from 96° C. to 120° C., or from 100° C. to 115° C., and polymerization pressures in a range from 700 to 1500 psig, from 800 to 1200 psig, or from 900 to 1100 psig. Beneficially, the polymerization temperature can be below the melting point of the respective olefin polymer formed in the loop slurry reactor.

While not limited thereto, the loop slurry reactor can have any suitable design or configuration, such as a length/diameter (L/D) ratio from 500 to 3,000 (e.g., from 700 to 1,500), an inside diameter from to 15 to 30 in (e.g., from 15 to 30 in, from 20 to 30 in, from 24 to 30 in, from 15 to 28 in, from 20 to 28 in, or from 24 to 28 in), a length from 1,000 to 10,000 ft (e.g., from 2,000 to 10,000 ft, from 5,000 to 10,000 ft, from 1,000 to 8,000 ft, from 2,000 to 8,000 ft, or from 4,000 to 8,000 ft), with from 4 to 24 legs (e.g., from 8 to 24, from 12 to 24, or 4, 8, 12, 16, 20, or 24 legs), and reactor leg heights ranging independently from 100 to 400 ft (e.g., from 200 to 300 ft, or from 150 to 250 ft), and the structure of the loop slurry reactor can be supported or free standing, and the reactor configuration can be horizontal or vertical. The loop slurry reactor can be constructed of any suitable material, including carbon steel, stainless steel, low temperature carbon steel, and the like, as well as combinations thereof.

Additionally or alternatively, the loop slurry reactor can have any suitable volume, but typically in the range of from 15,000 to 100,000 gal. Non-limiting examples of suitable volumes of the loop slurry reactor include from 25,000 to 100,000 gal, from 25,000 to 75,000 gal, from 40,000 to 100,000 gal, or from 40,000 to 75,000 gal, and the like.

The polymerization reactor system comprises a reactor circulating pump, and in one aspect, the polymerization reactor system comprises from 1 to 6 reactor circulating pumps, while in another aspect, the polymerization reactor system comprises from 1 to 4 reactor circulating pumps, and in yet another aspect, the polymerization reactor system comprises 1 or 2 reactor circulating pumps. Thus, the polymerization reactor system can have 1, 2, 3, or 4 reactor circulating pumps, and therefore, the loop slurry reactor often can have 1, 2, 3, or 4 reactor circulating pumps associated therewith. Accordingly, the loop slurry reactor is associated with a reactor circulating pump, i.e., one or more than one reactor circulating pump, which can be an axial design, radial design, or mixed flow design.

Referring now to step (ii), the kW power consumption of the reactor circulating pump is measured to generate power consumption versus time data. As one of skill in art would readily recognize, the power consumption can be measured in various units of measure. However, the total of the peak intensities and the rates of change in step (iv)—discussed further below—depend upon the units of kW in step (ii). Other units for power consumption can be utilized herein with appropriate unit conversions, and thus are encompassed herein.

Power consumption versus time data can be collected over any suitable time interval, such as from 5 min to 1 hr, from 15 min to 45 min, or from 20 min to 40 min, and the like, although not limited thereto. Representative and non-limiting sampling intervals for the power consumption can include from 1 to 30 sec, from 1 to 15 sec, or from 5 to 10 sec, and the like, and likewise are not solely limited to these ranges.

In step (iii), the power consumption versus time data is converted using frequency analysis (or a frequency algorithm) to generate (a) intensity versus frequency data at a first frequency interval encompassing a time equal to one-half an average recirculation period in the loop slurry reactor, and (b) intensity versus frequency data at a second frequency interval encompassing a time equal to the average full recirculation period in the loop slurry reactor. Various frequency analysis techniques can be employed, such as a periodogram technique, a band pass filter analysis technique, a Fourier transform, and the like. Combinations of techniques for converting time series data into intensity versus frequency data can be utilized, if desired.

As an example, a dataset containing a time series of circulating pump kW data spanning 30 min and with a sampling frequency of 5 sec can be used. The number of datapoints in the dataset is set to N. Intensity versus frequency data for the first frequency interval and the second frequency interval, and the first peak intensity and the second peak intensity can be determined using Equations 1-5 provided below.

Suppose that the number of observations N=2q+1 is odd. If we fit the Fourier series model:

$$z_t = \alpha_0 + \sum_{i=1}^{q}(\alpha_i c_{it} + \beta_i s_{it}) + e_t \qquad \text{Equation 1}$$

where $c_{it}=\cos(2\pi f_i t)$, $s_{it}=\sin(2\pi f_i t)$, and $f_i=1/N$ is the ith harmonic of the fundamental frequency $1/N$, the least squares estimates of the coefficients $\alpha_0$ and $(\alpha_i, \beta_i)$ will be:

$$a_0 = \bar{z} \qquad \text{Equation 2}$$

$$\left. \begin{array}{l} a_i = \dfrac{2}{N}\sum_{t=1}^{N} z_t c_{it} \\ b_i = \dfrac{2}{N}\sum_{t=1}^{N} z_t s_{it} \end{array} \right\}$$

$$i = 1, 2, \ldots, q$$

The periodogram then consists of the $q=(N-1)/2$ values:

$$I(f_i) = \frac{N}{2}(a_i^2 + b_i^2) \qquad \text{Equation 3}$$

$$i = 1, 2, \ldots, q$$

where $I(f_i)$ is called the intensity at frequency $f_i$.

When N is even, we set N=2q, and Equations 1-3 apply for i=1, 2, . . . , (q−1), but:

$$a_q = \frac{1}{N}\sum_{t=1}^{N}(-1)^t z_t \qquad \text{Equation 4}$$

$$b_q = 0$$

and $$I(f_q) = I(0.5) = N a_q^2 \qquad \text{Equation 5}$$

Note that the highest frequency is 0.5 cycles per time interval because the smallest period is 2 intervals.

If the series were truly random, containing no systematic sinusoidal component, then each component I(fi) would have the same expected value, with actual values scattered with a chi-square distribution with 2 degrees of freedom. However, if the series contained a systematic sine component with a frequency of $f_i$, the value for $I(f_i)$ would be inflated at or in the immediate vicinity of $f_i$.

Thus, if there is a non-random frequency in the data, then the intensity at that frequency will be significantly larger than the general population of intensities. Because of this feature of a periodogram, it provides a tool for discovering non-random frequencies in time series data.

Note that the periodogram is one tool available for the purpose of analyzing time series data made up of mixtures of sine and cosine waves at fixed frequencies buried in noise. There are other more sophisticated tools, such as the spectrum and spectral density function that can also be used, and are more appropriate if the frequencies are not fixed. Since the loop reactor geometry and flow properties are known and do not significantly vary, the fixed-frequency analysis of the periodogram is appropriate.

Referring again to step (iii), the power consumption versus time data is converted using frequency analysis (or a frequency algorithm) to generate (a) intensity versus frequency data at a first frequency interval encompassing a time equal to one-half an average recirculation period in the loop slurry reactor, and (b) intensity versus frequency data at a second frequency interval encompassing a time equal to the average full recirculation period in the loop slurry reactor. The first frequency interval for intensity versus frequency data encompasses a time equal to one-half an average recirculation period in the loop slurry reactor. Thus, the objective of the first frequency interval is to encompass a time period that is equal to one-half the average recirculation time in the loop slurry reactor. While not limited thereto, the first frequency interval comprises a range of time equal to +/−30% of one-half the average recirculation period in the loop slurry reactor. In some aspects, the first frequency interval can be narrowed to comprise a range of time equal to +/−25% (or +/−20%) of one-half the average recirculation period in the loop slurry reactor, while in other aspects, the first frequency interval can be narrowed significantly to comprise a range of time equal to +/−15% (or +/−10%) of one-half the average recirculation period in the loop slurry reactor. As an example, if the average recirculation period in the loop slurry reactor is 60 sec, then one-half the average recirculation period in the loop slurry reactor is 30 sec. Accordingly, the first frequency interval can comprise a range of time equal to 21-39 sec (+/−30%), and in some aspects, the first frequency interval can be narrowed to comprise a range of time equal to 22.5-37.5 sec (+/−25%) or 24-36 sec (+/−20%), while in other aspects, the first frequency interval can be narrowed significantly to comprise a range of time equal to 25.5-34.5 sec (+/−15%) or 27-33 sec (+/−10%), although not necessarily limited only to these ranges.

Likewise, the second frequency interval for intensity versus frequency data encompasses a time equal to the average recirculation period in the loop slurry reactor. Thus, the objective of the second frequency interval is to encompass a time period that is equal to the average recirculation time in the loop slurry reactor. While not limited thereto, the second frequency interval comprises a range of time equal to +/−30% of the average recirculation period in the loop slurry reactor. In some aspects, the second frequency interval can be narrowed to comprise a range of time equal to +/−25% (or +/−20%) of the average recirculation period in the loop slurry reactor, while in other aspects, the second frequency interval can be narrowed significantly to comprise a range of time equal to +/−15% (or +/−10%) of the average recirculation period in the loop slurry reactor. As an example, if the average recirculation period in the loop slurry reactor is 60 sec, then the second frequency interval can comprise a range of time equal to 42-78 sec (+/−30%), and in some aspects, the second frequency interval can be narrowed to comprise a range of time equal to 45-75 sec (+/−25%) or 48-72 sec (+/−20%), while in other aspects, the second frequency interval can be narrowed significantly to comprise a range of time equal to 51-69 sec (+/−15%) or 54-66 sec (+/−10%), although not necessarily limited only to these ranges.

Referring now to step (iv) in the first process, the production rate of the olefin polymer in the loop slurry reactor is reduced when a total of a first peak intensity at the first frequency interval and a second peak intensity at the second frequency interval is equal to 10,000 or more. Thus, generally no action is taken relative to the production rate of the olefin polymer in the loop slurry reactor until a total of a first peak intensity at the first frequency interval and a second peak intensity at the second frequency interval reaches at least 10,000. This minimum total prior to any step to reduce the production rate is not an absolute requirement, and higher totals can be reached prior to reducing the production rate, such as when the total of the first and second peak intensities is equal to 12,500 or more, equal to 15,000 or more, equal to 17,500 or more, equal to 20,000 or more, or equal to 30,000 or more, and the like. Generally, during typical or normal production, the total of the first and second peak intensities can be below 1,000 or fall within a range from 1,000 to 5,000 (e.g., 2,500 to 3,500), thus changing the production rate at a total less than 10,000 can lead to what can be termed as false positives—purposefully adjusting/reducing the production rate of the loop slurry reactor when no action is needed. As shown by the examples that follow, it was empirically determined that when the total of the first and second peak intensities reaches 10,000-30,000, a fouling event or other process upset is likely to occur, unless corrective action is taken.

A primary means of corrective action is to reduce the polymer production rate. The reduction in the production rate in step (iv) can accomplished in different ways, such as one or more steps that can include (a) reducing a monomer flow rate (e.g., ethylene flow rate) into the loop slurry reactor in one aspect, (b) reducing a comonomer flow rate (if comonomer is used) into the loop slurry reactor in another aspect, (c) increasing a diluent flow rate (e.g., inert hydrocarbon such as propane or isobutane) into the loop slurry reactor in yet another aspect, as well as (d) any combination of these steps in still another aspect. As an example, if the total of the intensities reaches 10,000, then the flow rate of the monomer (or comonomer, or both) into the loop slurry reactor can be reduced.

If action is not taken at one of these total intensities (from 10,000 to 30,000), and the total reaches at least 40,000, more drastic measures often are required to prevent a reactor foul or other significant reactor incident. Hence, at this stage, one or more steps are taken that can include (A) discontinuing monomer addition into the loop slurry reactor in one aspect, (B) discontinuing catalyst system addition into the loop slurry reactor in another aspect, (C) introducing a catalyst deactivating agent into the loop slurry reactor to partially or completely terminate the polymerization reaction in the loop slurry reactor in yet another aspect, as well as (D) any combination of these steps in still another aspect.

As disclosed herein, the kW power consumption of the reactor circulating pump can be measured effectively continuously, such as every 5 sec, to generate power consumption versus time data. This real-time data can be compiled and stored in a control system (which can comprise any suitable processing unit or computer system, or can interface with any suitable external processing unit or external computer system). Once a suitable time interval of the power consumption versus time data has been compiled, such as over a 30 min time interval, the control system can convert this time series data using frequency analysis to generate the intensity versus frequency data at the first and the second frequency intervals encompassing a time equal to one-half an average recirculation period in the loop slurry reactor and encompassing a time equal to the average full recirculation period in the loop slurry reactor, respectively. The control system then can generate, from the intensity versus frequency data, totals of a first peak intensity at the first frequency interval and a second peak intensity at the second frequency interval (and/or the rate of change of the first peak intensity at the first frequency interval and/or the rate of change of the second peak intensity at the second frequency interval). This process can be repeated at any suitable time interval, such as from 2 min to 30 min. As an example, the prior 30 min of power consumption data can be compiled, analyzed, and converted to a total of peak intensities (and/or rates of change of the peak intensities), then 5 min later (or 10 min, or 15 min), the prior 30 min of power consumption data can be compiled, analyzed, and converted to a total of peak intensities (and/or rates of change of the peak intensities). In this manner, any trend that shows a rapid increase in the total of peak intensities (and/or in the rates of change of the peak intensities) can be evaluated quickly for appropriate corrective action. Due to the large amount of data and sophisticated computations needed to convert the data, the process is typically automated using an internal computer system within the control system or an external computer system interfacing with the control system.

Optionally, the control system can analyze the trends in the total of peak intensities, and when a total of the first peak intensity (at the first frequency interval) and the second peak intensity (at the second frequency interval) is equal to 10,000 or more (or alternatively, 15,000 or more, or alternatively, 20,000 or more), the control system can automatically reduce the production rate of the olefin polymer in the loop slurry reactor via one or more suitable controllers that can reduce a monomer flow rate into the loop slurry reactor, reduce a comonomer flow rate into the loop slurry reactor, and/or increase a diluent flow rate into the loop slurry reactor. In another aspect, the peak intensity data can be outputted to a monitor integrated with the control system for review by an operator of the loop slurry reactor. The operator then can consider the appropriate corrective action to be taken, if any, in view of the peak intensity data.

Referring now to step (iv) in the second process, the production rate of the olefin polymer in the loop slurry reactor is reduced when a rate of change (a slope) of at least one of a first peak intensity at the first frequency interval and/or a second peak intensity at the second frequency interval is equal to 5,000/hr or more. Thus, generally no action is taken relative to the production rate of the olefin polymer in the loop slurry reactor until the rate of change of the first peak intensity at the first frequency interval or the rate of change of the second peak intensity at the second frequency interval is equal to 5,000/hr or more. This minimum rate of change (or slope) prior to any step to reduce the production rate is not an absolute requirement, and higher rates of increase (higher slopes) can be reached prior to reducing the production rate, such as when the rate of change of at least one of the first peak intensity at the first frequency interval and/or the second peak intensity at the second frequency interval is equal to 6,000/hr or more, equal to 8,000/hr or more, equal to 10,000/hr or more, or equal to 12,500/hr or more, and the like. Generally, during typical or normal production, the rate of change of the first peak intensity at the first frequency interval or the rate of change of the second peak intensity at the second frequency interval can be below 1,000/hr or fall within a range from 1,000/hr to 3,000/hr, thus changing the production rate at a rate of change less than 5,000/hr can lead to what can be termed as false positives—purposefully adjusting/reducing the production rate of the loop slurry reactor when no action is needed. As shown by the examples that follow, it was empirically determined that when the rate of change of the first peak intensity at the first frequency interval or the rate of change of the second peak intensity at the second frequency interval reaches 5,000-10,000/hr, a fouling event or other process upset is likely to occur, unless corrective action is taken.

As above, the primary means of corrective action is to reduce the polymer production rate. The reduction in the production rate in step (iv) can accomplished in different ways, such as one or more steps that can include (a) reducing a monomer flow rate (e.g., ethylene flow rate) into the loop slurry reactor in one aspect, (b) reducing a comonomer flow rate (if comonomer is used) into the loop slurry reactor in another aspect, (c) increasing a diluent flow rate (e.g., inert hydrocarbon such as propane or isobutane) into the loop slurry reactor in yet another aspect, as well as (d) any combination of these steps in still another aspect. As an example, if the rate of change of the first peak intensity at the first frequency interval or the rate of change of the second peak intensity at the second frequency interval reaches 5,000/hr, then the flow rate of the monomer (or comonomer, or both) into the loop slurry reactor can be reduced.

If action is not taken at one of these rates of change (e.g., from 5,000/hr to 12,500/hr), and the slope reaches at least 15,000/hr, more drastic measures often are required to prevent a reactor foul or other significant reactor incident. Hence, at this stage, one or more steps are taken that can include (A) discontinuing monomer addition into the loop slurry reactor in one aspect, (B) discontinuing catalyst system addition into the loop slurry reactor in another aspect, (C) introducing a catalyst deactivating agent into the loop slurry reactor to partially or completely terminate the polymerization reaction in the loop slurry reactor in yet another aspect, as well as (D) any combination of these steps in still another aspect.

Similar to the control system's analysis of the trends in the total of peak intensities, the control system can analyze trends of the rate of change or slope of the first peak intensity (at the first frequency interval) and the rate of change or slope of the second peak intensity (at the second frequency interval), and when the either rate of change is equal to 5,000/hr or more (or alternatively, 6,000/hr or more, or alternatively, 8,000/hr or more, or alternatively, 10,000/hr or more), the control system can automatically reduce the production rate of the olefin polymer in the loop slurry reactor via one or more suitable controllers that can reduce a monomer flow rate into the loop slurry reactor, reduce a comonomer flow rate into the loop slurry reactor, and/or increase a diluent flow rate into the loop slurry reactor. In another aspect, the rate of change data can be outputted to a monitor integrated with the control system for review by an operator of the loop slurry reactor. The operator then can consider the appropriate corrective action to be taken, if any, in view of the rate of change data.

Catalyst Systems

The methods disclosed herein are applicable to any transition metal-based catalyst system suitable for the polymerization of an olefin monomer. Herein, a "catalyst system" also can be referred to as a "catalyst composition," and these terms are used interchangeably. In the catalyst system (or the catalyst composition), the transition metal compound can comprise (or each transition metal compound independently can comprise, if two or more transition metal compound are present in the catalyst system) a transition metal (one or more than one) from Groups 3-12 of the Periodic Table of the Elements (*Chemical and Engineering News*, 63(5), 27, 1985). In one aspect, the transition metal compound can comprise (or each transition metal compound independently can comprise) a Group 3, 4, 5, or 6 transition metal, or a combination of two or more transition metals. The transition metal compound can comprise (or each transition metal compound independently can comprise) chromium, vanadium, titanium, zirconium, hafnium, or a combination thereof, in some aspects, or can comprise chromium, titanium, zirconium, hafnium, or a combination thereof, in other aspects. Accordingly, the transition metal compound can comprise (or each transition metal compound independently can comprise) chromium, or titanium, or zirconium, or hafnium, either singly or in combination.

Transition metal-based catalyst systems that are suitable for use in the methods described herein include, but are not limited to, Ziegler-Natta based catalyst systems, chromium-based catalyst systems, metallocene-based catalyst systems, and the like, including combinations thereof. Hence, the catalyst composition can be a Ziegler-Natta based catalyst system, a chromium-based catalyst system, and/or a metallocene-based catalyst system; alternatively, a Ziegler-Natta based catalyst system; alternatively, a chromium-based catalyst system; or alternatively, a metallocene-based catalyst system. In one aspect, the catalyst composition can be a dual catalyst system comprising at least one metallocene compound, while in another aspect, the catalyst composition can be a dual catalyst system comprising two different metallocene compounds.

Examples of representative and non-limiting catalyst compositions include those disclosed in U.S. Pat. Nos. 3,887,494, 4,053,436, 4,981,831, 4,364,842, 4,444,965, 4,364,855, 4,504,638, 4,364,854, 4,444,964, 4,444,962, 3,976,632, 4,248,735, 4,297,460, 4,397,766, 2,825,721, 3,225,023, 3,226,205, 3,622,521, 3,625,864, 3,900,457, 4,301,034, 4,547,557, 4,339,559, 4,806,513, 5,037,911, 5,219,817, 5,221,654, 4,081,407, 4,296,001, 4,392,990, 4,405,501, 4,151,122, 4,247,421, 4,397,769, 4,460,756, 4,182,815, 4,735,931, 4,820,785, 4,988,657, 5,436,305, 5,610,247, 5,627,247, 3,242,099, 4,808,561, 5,275,992, 5,237,025, 5,244,990, 5,179,178, 4,855,271, 4,939,217, 5,210,352, 5,401,817, 5,631,335, 5,571,880, 5,191,132, 5,480,848, 5,399,636, 5,565,592, 5,347,026, 5,594,078, 5,498,581, 5,496,781, 5,563,284, 5,554,795, 5,420,320, 5,451,649, 5,541,272, 5,631,203, 5,654,454, 5,705,579, 5,668,230, 6,300,271, 6,831,141, 6,653,416, 6,613,712, 7,294,599, 6,355,594, 6,395,666, 6,833,338, 7,417,097, 6,548,442, 7,312,283, 7,026,494, 7,041,617, 7,199,073, 7,226,886, 7,517,939, 7,619,047, 7,919,639, and 8,080,681.

Such polymerization catalyst compositions, in addition to a transition metal, can contain an activator and an optional co-catalyst, and the catalyst system can be unsupported or supported on any suitable solid support (e.g., a porous solid oxide). Illustrative activators can include, but are not limited to, aluminoxane compounds (e.g., methylaluminoxane, MAO), organoboron or organoborate compounds, ionizing ionic compounds, activator-supports (e.g., a solid oxide treated with an electron-withdrawing anion), and the like, or combinations thereof. In one aspect, the activator can comprise an aluminoxane compound, while in another aspect, the activator can comprise an organoboron or organoborate compound, and in yet another aspect, the activator can comprise an ionizing ionic compound, and in still another aspect, the activator can comprise an activator-support.

The activator-support can comprise a solid oxide treated with an electron-withdrawing anion, and in some aspects, the activator-support can comprise a solid oxide treated with an electron-withdrawing anion, the solid oxide containing a Lewis-acidic metal ion. Non-limiting examples of suitable activator-supports are disclosed in, for instance, U.S. Pat. Nos. 7,294,599, 7,601,665, 7,884,163, 8,309,485, 8,623,973, and 8,703,886.

The solid oxide can encompass oxide materials such as alumina, "mixed oxides" thereof such as silica-alumina, coatings of one oxide on another, and combinations and mixtures thereof. The mixed oxides such as silica-alumina can be single or multiple chemical phases with more than one metal combined with oxygen to form the solid oxide. Examples of mixed oxides that can be used to form an activator-support, either singly or in combination, can include, but are not limited to, silica-alumina, silica-titania, silica-zirconia, alumina-titania, alumina-zirconia, zinc-aluminate, alumina-boria, silica-boria, aluminophosphate-silica, titania-zirconia, and the like. The solid oxide used herein also can encompass oxide materials such as silica-coated alumina, as described in U.S. Pat. No. 7,884,163.

Accordingly, in one aspect, the solid oxide can comprise silica, alumina, silica-alumina, silica-coated alumina, aluminum phosphate, aluminophosphate, heteropolytungstate, titania, silica-titania, zirconia, silica-zirconia, magnesia, boria, zinc oxide, any mixed oxide thereof, or any combination thereof. In another aspect, the solid oxide can comprise alumina, silica-alumina, silica-coated alumina, aluminum phosphate, aluminophosphate, heteropolytungstate, titania, silica-titania, zirconia, silica-zirconia, magnesia, boria, or zinc oxide, as well as any mixed oxide thereof, or any mixture thereof. In another aspect, the solid oxide can comprise silica, alumina, titania, zirconia, magnesia, boria, zinc oxide, any mixed oxide thereof, or any combination thereof. In yet another aspect, the solid oxide can comprise silica-alumina, silica-coated alumina, silica-titania, silica-zirconia, alumina-boria, or any combination thereof. In still another aspect, the solid oxide can comprise alumina, silica-alumina, silica-coated alumina, or any mixture thereof; alternatively, alumina; alternatively, silica-alumina; or alternatively, silica-coated alumina.

The silica-alumina or silica-coated alumina solid oxide materials which can be used can have an silica content from 5% by weight to 95% by weight. In one aspect, the silica content of these solid oxides can be from 10% by weight to 80% silica by weight, or from 20% by weight to 70% silica by weight. In another aspect, such materials can have silica contents ranging from 15% to 60% silica by weight, or from 25% to 50% silica by weight. The solid oxides contemplated herein can have any suitable surface area, pore volume, and particle size, as would be recognized by those of skill in the art.

The electron-withdrawing component used to treat the solid oxide can be any component that increases the Lewis or Bronsted acidity of the solid oxide upon treatment (as compared to the solid oxide that is not treated with at least one electron-withdrawing anion). According to one aspect, the electron-withdrawing component can be an electron-withdrawing anion derived from a salt, an acid, or other compound, such as a volatile organic compound, that serves as a source or precursor for that anion. Examples of electron-withdrawing anions can include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, phosphotungstate, tungstate, molybdate, and the like, including mixtures and combinations thereof. In addition, other ionic or non-ionic compounds that serve as sources for these electron-withdrawing anions also can be employed. It is contemplated that the electron-withdrawing anion can be, or can comprise, fluoride, chloride, bromide, phosphate, triflate, bisulfate, or sulfate, and the like, or any combination thereof, in some aspects provided herein. In other aspects, the electron-withdrawing anion can comprise sulfate, bisulfate, fluoride, chloride, bromide, iodide, fluorosulfate, fluoroborate, phosphate, fluorophosphate, trifluoroacetate, triflate, fluorozirconate, fluorotitanate, and the like, or combinations thereof. Yet, in other aspects, the electron-withdrawing anion can comprise fluoride and/or sulfate.

The activator-support generally can contain from 1 wt. % to 25 wt. % of the electron-withdrawing anion, based on the weight of the activator-support. In particular aspects provided herein, the activator-support can contain from 1 to 20 wt. %, from 2 wt. % to 20 wt. %, from 3 wt. % to 20 wt. %, from 2 wt. % to 15 wt. %, from 3 wt. % to 15 wt. %, from 3 wt. % to 12 wt. %, or from 4 wt. % to 10 wt. %, of the electron-withdrawing anion, based on the total weight of the activator-support.

In an aspect, the activator-support can comprise fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, fluorided-chlorided silica-coated alumina, sulfated silica-coated alumina, phosphated silica-coated alumina, and the like, as well as any mixture or combination thereof. In another aspect, the activator-support employed in the catalyst systems described herein can be, or can comprise, a fluorided solid oxide and/or a sulfated solid oxide, non-limiting examples of which can include fluorided alumina, sulfated alumina, fluorided silica-alumina, sulfated silica-alumina, fluorided silica-zirconia, fluorided silica-coated alumina, sulfated silica-coated alumina, and the like, as well as combinations thereof. In yet another aspect, the activator-support can comprise fluorided alumina; alternatively, chlorided alumina; alternatively, sulfated alumina; alternatively, fluorided silica-alumina; alternatively, sulfated silica-alumina; alternatively, fluorided silica-zirconia; alternatively, chlorided silica-zirconia; alternatively, sulfated silica-coated alumina; alternatively, fluorided-chlorided silica-coated alumina; or alternatively, fluorided silica-coated alumina. In some aspects, the activator-support can comprise a fluorided solid oxide, while in other aspects, the activator-support can comprise a sulfated solid oxide.

Various processes can be used to form activator-support useful in the present invention. Methods of contacting the solid oxide with the electron-withdrawing component, suitable electron withdrawing components and addition amounts, impregnation with metals or metal ions (e.g., zinc, nickel, vanadium, titanium, silver, copper, gallium, tin, tungsten, molybdenum, zirconium, and the like, or combinations thereof), and various calcining procedures and conditions are disclosed in, for example, U.S. Pat. Nos. 6,107,230, 6,165,929, 6,294,494, 6,300,271, 6,316,553, 6,355,594, 6,376,415, 6,388,017, 6,391,816, 6,395,666, 6,524,987, 6,548,441, 6,548,442, 6,576,583, 6,613,712, 6,632,894, 6,667,274, 6,750,302, 7,294,599, 7,601,665, 7,884,163, and 8,309,485. Other suitable processes and procedures for preparing activator-supports (e.g., fluorided solid oxides and sulfated solid oxides) are well known to those of skill in the art.

Commonly used polymerization co-catalysts can include, but are not limited to, organoaluminum and organozinc compounds, illustrative examples of which include trimethylaluminum (TMA), triethylaluminum (TEA), tri-n-propylaluminum (TNPA), tri-n-butylaluminum (TNBA), tri-isobutylaluminum (TIBA), tri-n-hexylaluminum, tri-n- octylaluminum, diisobutylaluminum hydride, diethylaluminum ethoxide, diethylaluminum chloride, dimethylzinc, diethylzinc (DEZ), dipropylzinc, dibutylzinc, dineopentylzinc, di(trimethylsilyl)zinc, di(triethylsilyl)zinc, di(triisoproplysilyl)zinc, di(triphenylsilyl)zinc, di(allyldimethylsilyl)zinc, di(trimethylsilylmethyl)zinc, and the like, or combinations thereof. In an aspect, the catalyst system comprises an organoaluminum co-catalyst, and the organoaluminum co-catalyst can comprise triethylaluminum, triisobutylaluminum, or a mixture of both.

In some aspects, the transition metal-based catalyst system can be a chromium-based catalyst system, which can utilize chromium/silica, chromium/silica-titania, chromium/silica-titania-magnesia, chromium/silica-alumina, chromium/silica-coated alumina, chromium/aluminophosphate, chromium/alumina, chromium/alumina borate, and the like, or any combination thereof.

In some aspects, the transition metal-based catalyst system can comprise a metallocene catalyst component, while in other aspects, the catalyst system can comprise a first metallocene catalyst component and a second metallocene catalyst component. The catalyst systems can contain an activator and, optionally, a co-catalyst. Any metallocene component of the catalyst systems provided herein can, in some aspects, comprise an unbridged metallocene; alternatively, an unbridged zirconium or hafnium based metallocene compound; alternatively, an unbridged zirconium or hafnium based metallocene compound containing two cyclopentadienyl groups, two indenyl groups, or a cyclopentadienyl and an indenyl group; alternatively, an unbridged zirconium based metallocene compound containing two cyclopentadienyl groups, two indenyl groups, or a cyclopentadienyl and an indenyl group. Illustrative and non-limiting examples of unbridged metallocene compounds (e.g., with zirconium or hafnium) that can be employed in catalyst systems consistent with aspects of the present invention are described in U.S. Pat. Nos. 7,199,073, 7,226,886, 7,312,283, and 7,619,047.

In other aspects, any metallocene component of the catalyst systems provided herein can comprise a bridged metallocene compound, e.g., with titanium, zirconium, or hafnium, such as a bridged zirconium based metallocene compound with a fluorenyl group, and with no aryl groups on the bridging group, or a bridged zirconium based metallocene compound with a cyclopentadienyl group and a fluorenyl group, and with no aryl groups on the bridging group. Such bridged metallocenes, in some aspects, can contain an alkenyl substituent (e.g., a terminal alkenyl) on the bridging group, on a cyclopentadienyl-type group (e.g., a cyclopentadienyl group or a fluorenyl group), or on the bridging group and the cyclopentadienyl-type group. In another aspect, the metallocene catalyst component can comprise a bridged zirconium or hafnium based metallocene compound with a fluorenyl group, and an aryl group on the bridging group; alternatively, a bridged zirconium or hafnium based metallocene compound with a cyclopentadienyl group and fluorenyl group, and an aryl group on the bridging group; alternatively, a bridged zirconium based metallocene compound with a fluorenyl group, and an aryl group on the bridging group; or alternatively, a bridged hafnium based metallocene compound with a fluorenyl group, and an aryl group on the bridging group. In these and other aspects, the aryl group on the bridging group can be a phenyl group. Optionally, these bridged metallocenes can contain an alkenyl substituent (e.g., a terminal alkenyl) on the bridging group, on a cyclopentadienyl-type group, or on both the bridging group and the cyclopentadienyl group. Illustrative and non-limiting examples of bridged metallocene compounds (e.g., with zirconium or hafnium) that can be employed in catalyst systems consistent with aspects of the present invention are described in U.S. Pat. Nos. 7,026,494, 7,041,617, 7,226,886, 7,312,283, 7,517,939, and 7,619,047.

Olefin Monomers and Olefin Polymers

Olefin monomers contemplated herein typically include olefin compounds having from 2 to 30 carbon atoms per molecule and having at least one olefinic double bond. Homopolymerization processes using a single olefin, such as ethylene, propylene, butene, hexene, octene, and the like, are encompassed, as well as copolymerization, homopolymerization, terpolymerization, and similar polymerization reactions using an olefin monomer with at least one different olefinic compound.

As an example, any resultant ethylene copolymers or terpolymers generally can contain a major amount of ethylene (>50 mole percent) and a minor amount of comonomer (<50 mole percent). Comonomers that can be copolymerized with ethylene often have from 3 to 20 carbon atoms in their molecular chain.

Acyclic, cyclic, polycyclic, terminal ($\alpha$), internal, linear, branched, substituted, unsubstituted, functionalized, and non-functionalized olefins can be employed. For example, typical unsaturated compounds that can be polymerized to produce olefin polymers can include, but are not limited to, ethylene, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes (e.g., 1-octene), the four normal nonenes, the five normal decenes, and the like, or mixtures of two or more of these compounds. Cyclic and bicyclic olefins, including but not limited to, cyclopentene, cyclohexene, norbornylene, norbomadiene, and the like, also can be polymerized as described herein. Styrene also can be employed as a monomer or as a comonomer. In an aspect, the olefin monomer can comprise a $C_2$-$C_{20}$ olefin; alternatively, a $C_2$-$C_{12}$ olefin; alternatively, a $C_2$-$C_{20}$ $\alpha$-olefin; alternatively, a $C_2$-$C_{10}$ $\alpha$-olefin; alternatively, propylene, 1-butene, 1-pentene, 1-hexene, 1-heptene, 1-octene, 1-decene, or styrene; alternatively, ethylene, propylene, 1-butene, 1-hexene, or 1-octene; alternatively, ethylene or propylene; alternatively, ethylene; or alternatively, propylene.

When a copolymer (or alternatively, a terpolymer) is desired, the olefin monomer can comprise, for example, ethylene or propylene, which is copolymerized with at least one comonomer. According to one aspect, the olefin monomer in the polymerization process can comprise ethylene. In this aspect, examples of suitable olefin comonomers can include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, and the like, or combinations thereof. According to another aspect, the olefin monomer can comprise ethylene and the olefin comonomer can comprise an $\alpha$-olefin (e.g., a $C_3$-$C_{10}$ $\alpha$-olefin), while in yet another aspect, the comonomer can comprise propylene, 1-butene, 1-pentene, 1-hexene, 1-octene, 1-decene, styrene, or any combination thereof; or alternatively, the olefin comonomer can comprise 1-butene, 1-hexene, 1-octene, or a combination thereof.

Generally, the amount of comonomer introduced into a polymerization reactor to produce the copolymer can be from 0.01 weight percent (wt. %) to 50 weight percent of the comonomer based on the total weight of the monomer and comonomer. According to another aspect, the amount of comonomer introduced into a polymerization reactor can be from 0.01 weight percent to 40 weight percent comonomer based on the total weight of the monomer and comonomer. In still another aspect, the amount of comonomer introduced into a polymerization reactor can be from 0.1 weight percent to 35 weight percent comonomer based on the total weight of the monomer and comonomer. Yet, in another aspect, the amount of comonomer introduced into a polymerization reactor can be from 0.5 weight percent to 20 weight percent comonomer based on the total weight of the monomer and comonomer.

According to one aspect, at least one monomer/reactant can be ethylene, so the polymerization reaction can be a homopolymerization involving only ethylene, or a copolymerization with a different acyclic, cyclic, terminal, internal, linear, branched, substituted, or unsubstituted olefin. In addition, the methods disclosed herein intend for olefin to also encompass diolefin compounds that include, but are not limited to, 1,3-butadiene, isoprene, 1,4-pentadiene, 1,5-hexadiene, and the like.

Olefin polymers encompassed herein can include any polymer produced from any olefin monomer (and optional comonomer(s)) described herein. For example, the olefin polymer can comprise an ethylene homopolymer, a propylene homopolymer, an ethylene copolymer (e.g., ethylene/1-butene, ethylene/1-hexene, or ethylene/1-octene), a propylene random copolymer, a propylene block copolymer, and the like, including combinations thereof. In some aspects, the olefin polymer can comprise an ethylene homopolymer, an ethylene/1-butene copolymer, an ethylene/1-hexene copolymer, an ethylene/1-octene copolymer, or a combination thereof, while in other aspects, the olefin polymer can comprise an ethylene/1-butene copolymer, an ethylene/1-hexene copolymer, an ethylene/1-octene copolymer, or a combination thereof. Thus, the olefin polymer can comprise, for instance, an ethylene/1-hexene copolymer.

The methods for operating a polymerization reactor system disclosed herein can be used to produce olefin polymers having various melt flow rate, density, and molecular weight properties. For example, the melt index (MI) of the olefin polymer (e.g., an ethylene homopolymer and/or an ethylene/α-olefin copolymer) can be from 0 g/10 min to 25 g/10 min, from 0 g/10 min to 5 g/10 min, from 0 g/10 min to 1 g/10 min, from 0 g/10 min to 0.5 g/10 min, from 0.1 g/10 min to 10 g/10 min, from 0.1 g/10 min to 2 g/10 min, or from 0.1 g/10 min to 1 g/10 min, and the like.

In an aspect, the density of olefin polymers (e.g., ethylene homopolymers and/or an ethylene/α-olefin copolymers) produced by the methods disclosed herein can be in a range from 0.88 g/cc to 0.97 g/cc, or from 0.88 g/cc to 0.96 g/cc. In some aspects, the density can be in a range from 0.90 g/cc to 0.96 g/cc, from 0.91 g/cc to 0.96 g/cc, from 0.91 g/cc to 0.94 g/cc, from 0.92 g/cc to 0.95 g/cc, or from 0.92 g/cc to 0.94 g/cc, and the like.

In an aspect, the weight-average molecular weight (Mw) of the olefin polymer (e.g., an ethylene homopolymer and/or an ethylene/α-olefin copolymer) produced by the methods disclosed herein can be in a range from 50,000 g/mol to 1,000,000 g/mol, from 100,000 g/mol to 1,000,000 g/mol, or from 50,000 g/mol to 900,000 g/mol. In some aspects, the Mw can be in range from 100,000 g/mol to 900,000 g/mol, from 100,000 g/mol to 750,000 g/mol, from 100,000 g/mol to 350,000 g/mol, or from 100,000 g/mol to 250,000 g/mol. Ratios of Mw/Mn (and the breadth of the molecular weight distribution curve) for the olefin polymer can vary significantly based on the catalyst system employed and the desired properties of the olefin polymer, amongst other factors.

EXAMPLES

The invention is further illustrated by the following examples, which are not to be construed in any way as imposing limitations to the scope of this invention. Various other aspects, modifications, and equivalents thereof which, after reading the description herein, can suggest themselves to one of ordinary skill in the art without departing from the spirit of the present invention or the scope of the appended claims.

The data in Examples 1-5 was investigated retrospectively on commercial loop slurry reactors that experienced a prior reactor foul, process upset, or reactor shutdown. The loop reactors produced ethylene polymers (e.g., ethylene/1-hexene copolymers) using a metallocene-based catalyst system containing an activator-support (e.g., a fluorided solid oxide and/or a sulfated solid oxide) and an organoaluminum co-catalyst.

Example 1

Figure 2:
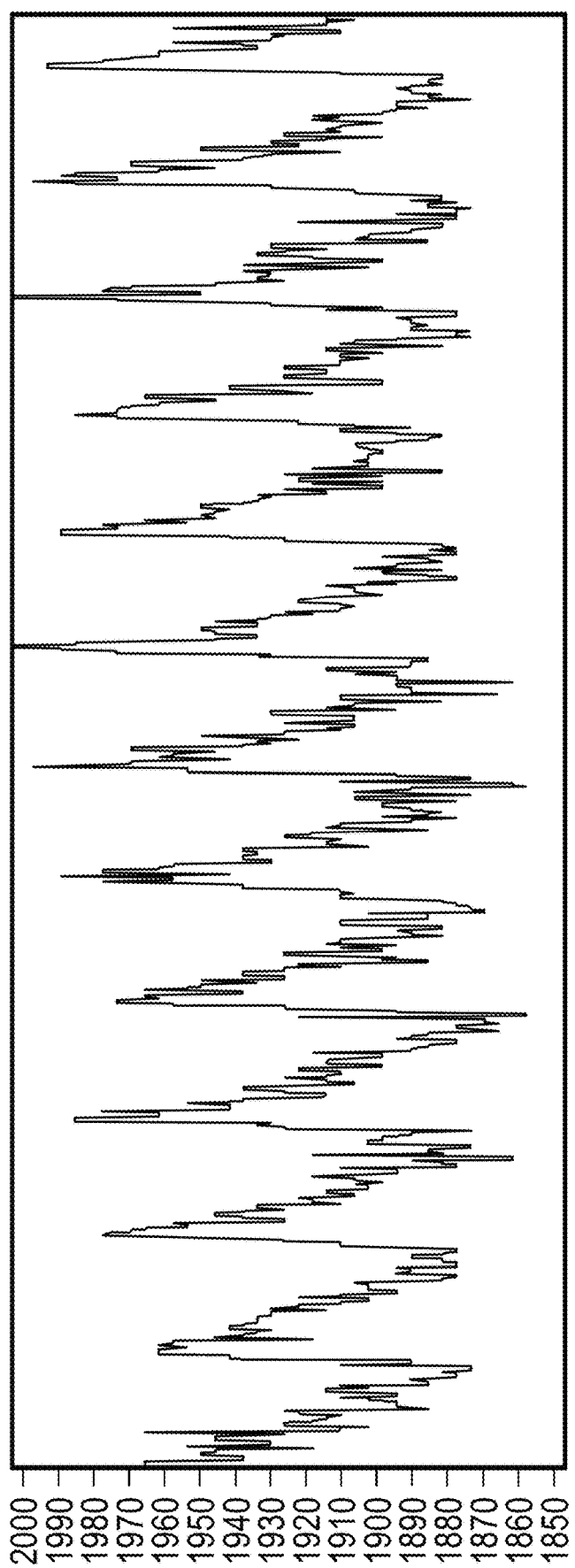
FIG. 2 presents a plot of power consumption (kW) over a 20-min time interval for a reactor circulating pump approximately 1.5 hr prior to a fouling event, as described in Example 1.

Approximately 12 hr prior to a fouling event in a loop slurry reactor, FIG. 1 illustrates the power consumption (kW) over a 20-min time interval for the reactor circulating pump. The reactor circulating pump power trend data showed little sign of periodic variation and appeared largely random, indicative of stable production. However, about 1.5 hr prior to the fouling event, the reactor circulating pump data showed clear evidence of periodic variation with a "sawtooth" shape, as illustrated in FIG. 2.

Figure 3A:
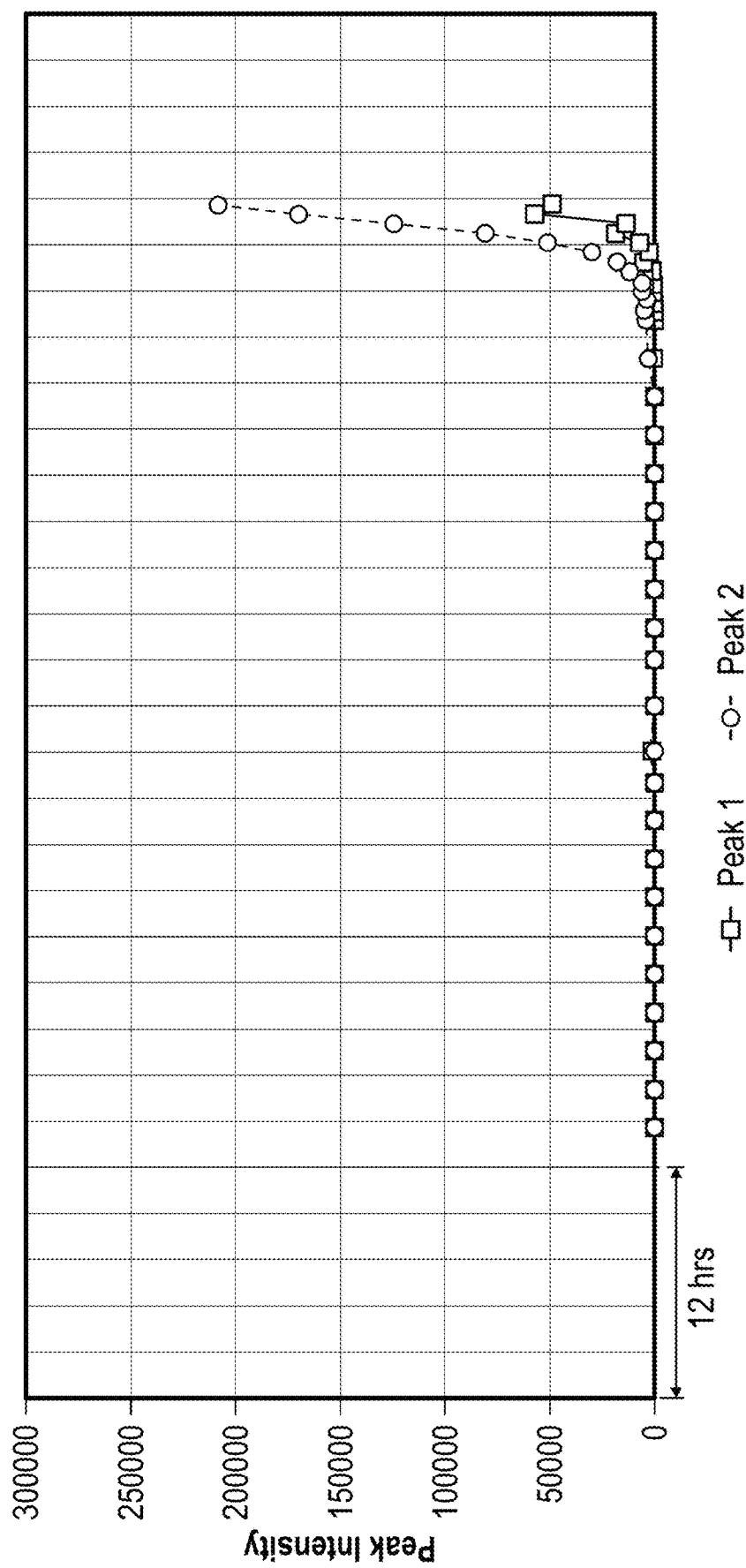
FIG. 3A presents a plot of peak intensity versus time and FIG. 3B presents a plot of peak intensity and the rate of change of peak intensity versus time, in which intensity versus frequency data at two frequency intervals are included, as described in Example 1.
Figure 3B:
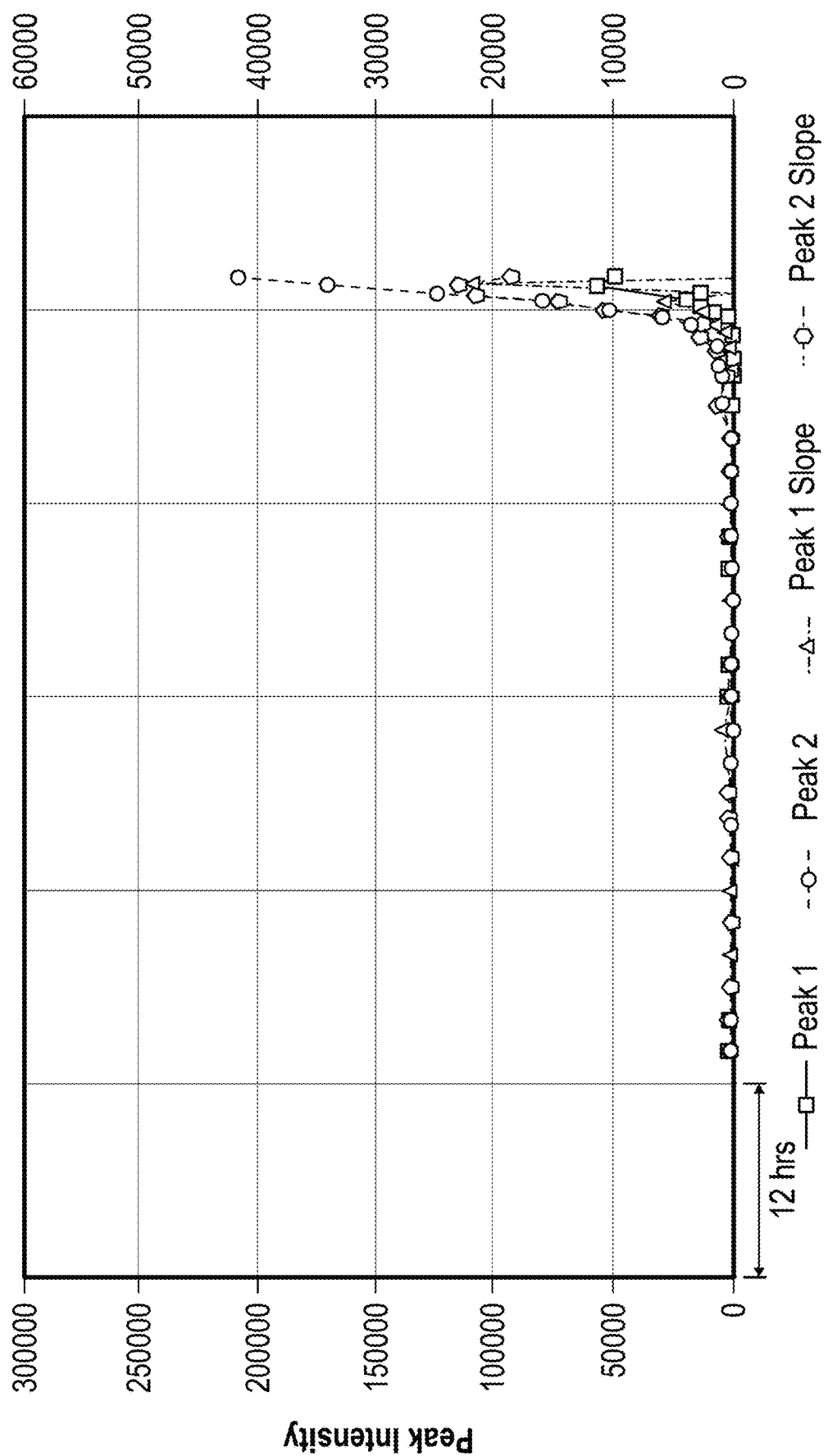

The power consumption versus time data was converted using frequency analysis (Fourier transform) for the period leading up to the fouling event. Thirty min of backward-looking power data at 5-sec sampling intervals were converted using the periodogram algorithm every two hr, and then every thirty min closer to the actual fouling event, as shown in FIGS. 3A-3B. The peak intensity values were captured in a first frequency interval of 40-60 sec and a second frequency interval of 80-120 sec, which encompassed one-half the average recirculation period in the loop reactor and the average full recirculation period in the loop reactor, respectively. In this example, there was a clear and rapid upward trend in periodicity observed in FIG. 3A with the highest intensity primary peak being "Peak 2"—the peak intensity for the average full recirculation period of approximately 90-95 sec—prior to reactor shutdown. Likewise, the rate of change of the peak intensity (on the right-side y-axis in FIG. 3B) mirrored the peak intensity, and also exhibited a clear and rapid upward trend in periodicity at the average full recirculation period of approximately 90-95 sec—prior to reactor shutdown.

Example 2

Figure 4:
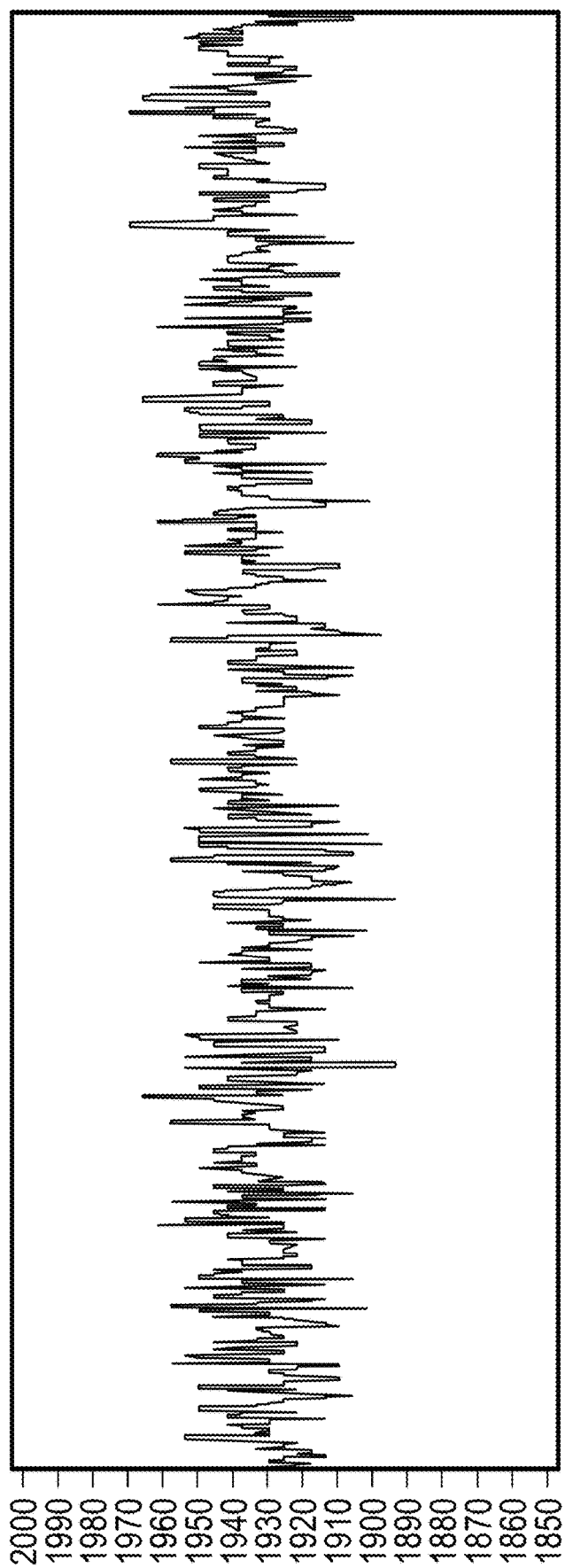
FIG. 4 presents a plot of power consumption (kW) over a 20-min time interval for a reactor circulating pump approximately 14 hr prior to a fouling event, as described in Example 2.
Figure 5:
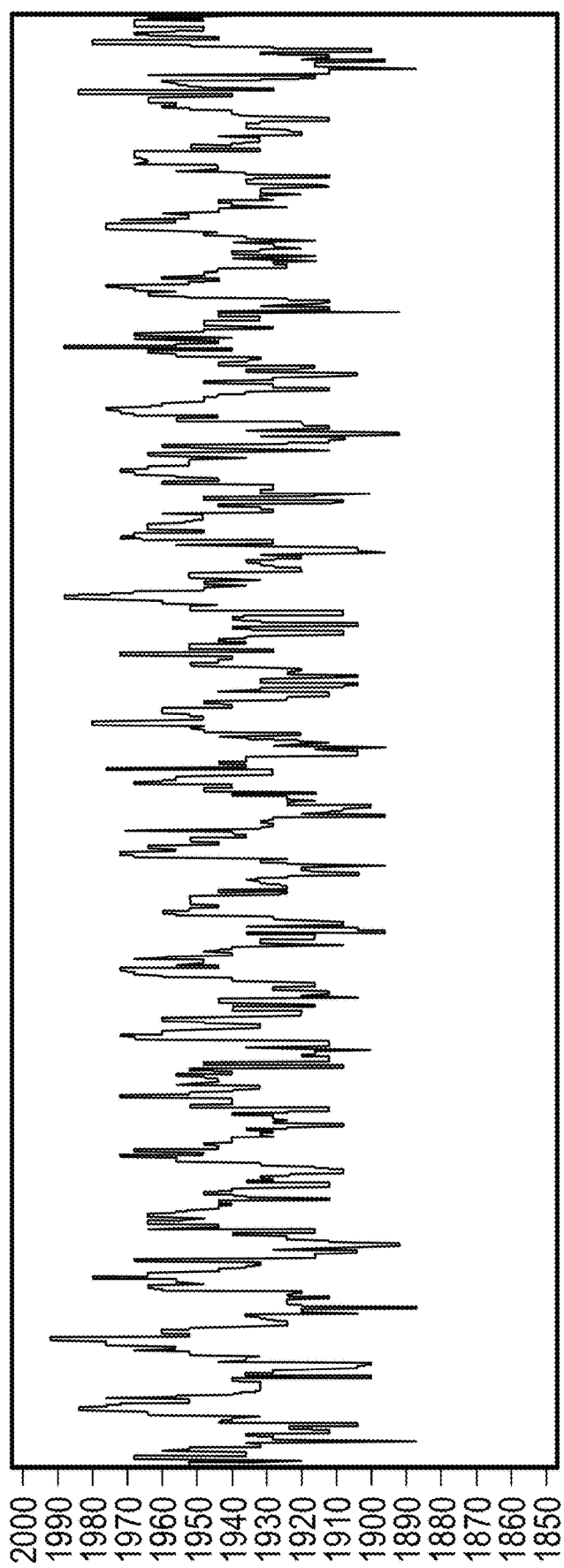
FIG. 5 presents a plot of power consumption (kW) over a 20-min time interval for a reactor circulating pump approximately 5 hr prior to a fouling event, as described in Example 2.

Approximately 14 hr prior to a fouling event in a loop slurry reactor, FIG. 4 illustrates the power consumption (kW) over a 20-min time interval for the reactor circulating pump. The reactor circulating pump power trend data showed little sign of periodic variation and appeared largely random, indicative of stable production. However, about 5 hr prior to the fouling event, the reactor circulating pump data showed clear evidence of periodic variation, as illustrated in FIG. 5. Interestingly, the oscillations are higher frequency than that shown in FIG. 2.

Figure 6:
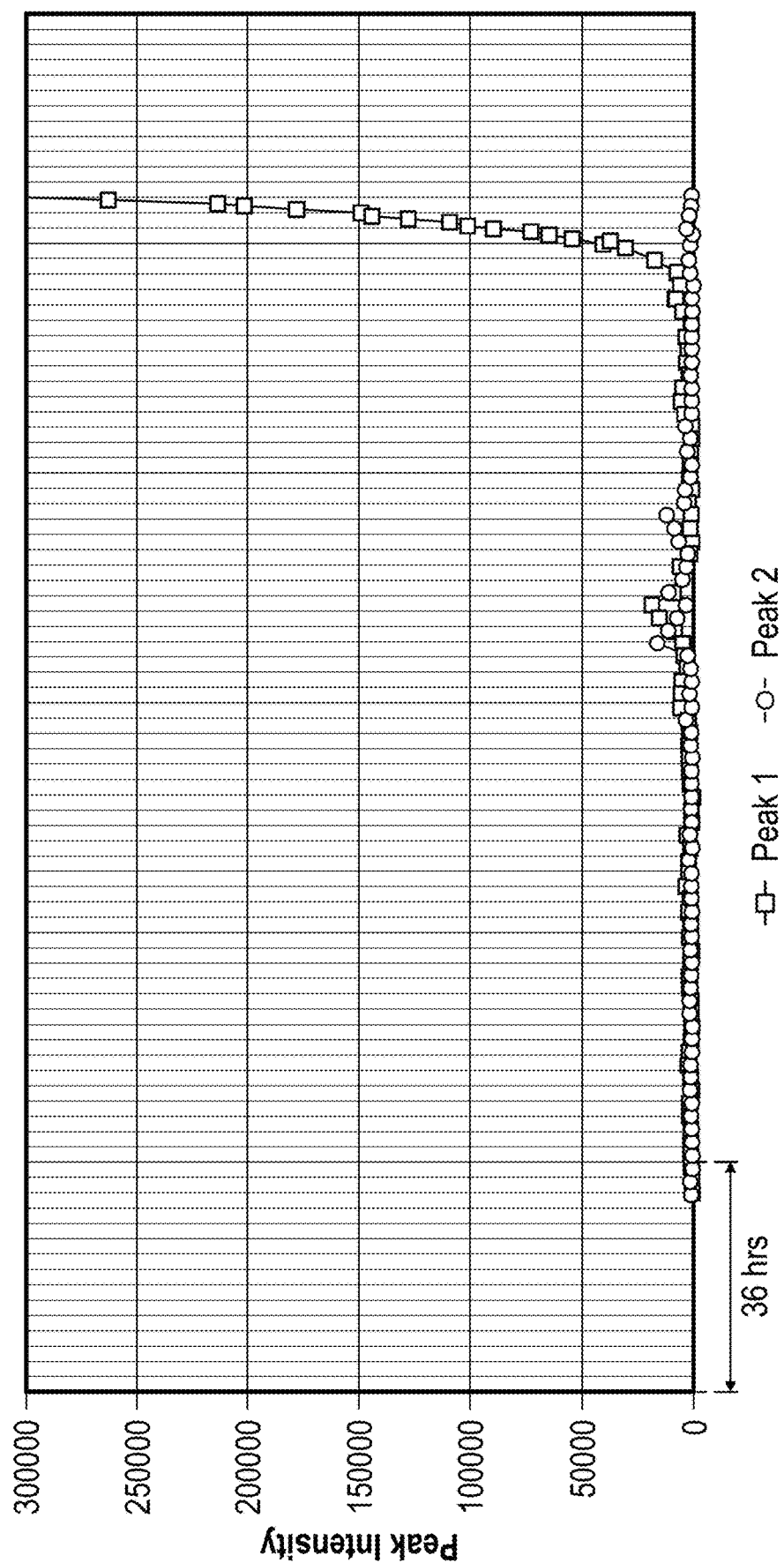
FIG. 6 presents a plot of peak intensity versus time in which intensity versus frequency data at two frequency intervals are included, as described in Example 2.

Similar to Example 1, the power consumption versus time data was converted using frequency analysis (Fourier transform) for the period leading up to the fouling event, and the result is shown in FIG. 6. The peak intensity values were collected in a first frequency interval encompassing ~50 sec and a second frequency interval encompassing ~100 sec, which were one-half the average recirculation period in the loop reactor and the average full recirculation period in the loop reactor, respectively. In this example, there was a clear and rapid upward trend in periodicity observed with the highest intensity primary peak being "Peak 1"—the peak intensity for the one-half the average recirculation period of approximately 50 sec—prior to reactor shutdown. Peak 2, the peak intensity for the average full recirculation period, was not elevated during the entire fouling event.

Example 3

Figure 7:
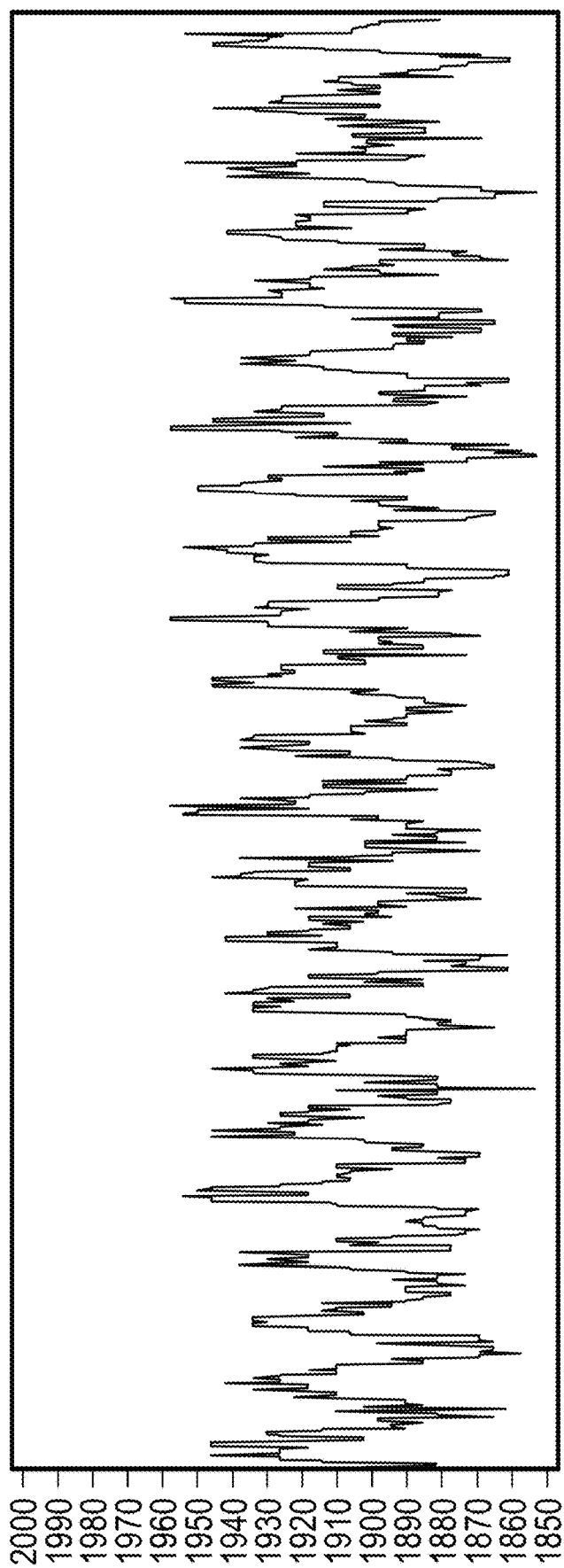
FIG. 7 presents a plot of power consumption (kW) over a 20-min time interval for a reactor circulating pump during a fouling event, as described in Example 3.
Figure 8A:
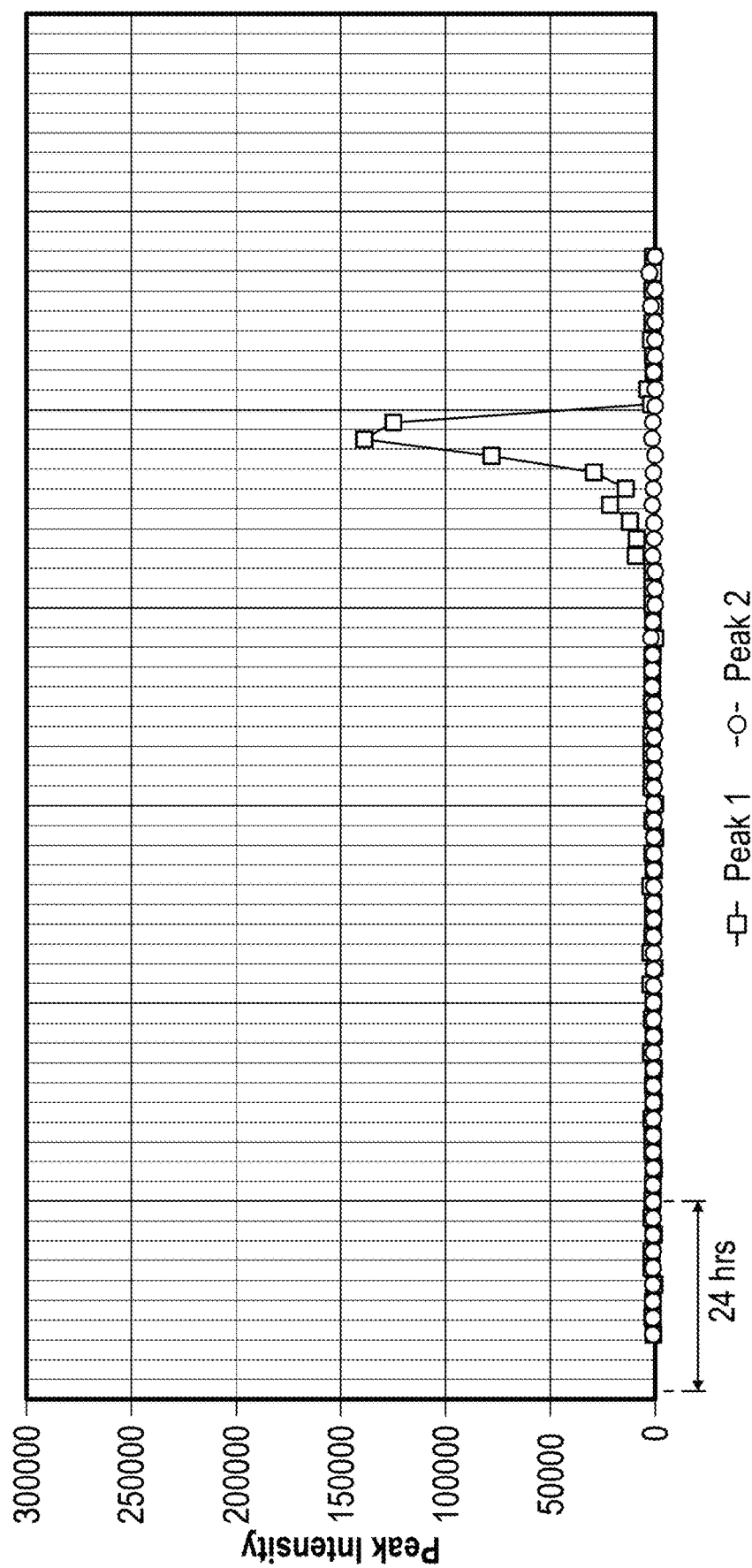
FIG. 8A presents a plot of peak intensity versus time and FIG. 8B presents a plot of peak intensity and the rate of change of peak intensity versus time, in which intensity versus frequency data at two frequency intervals are included, as described in Example 3.
Figure 8B:
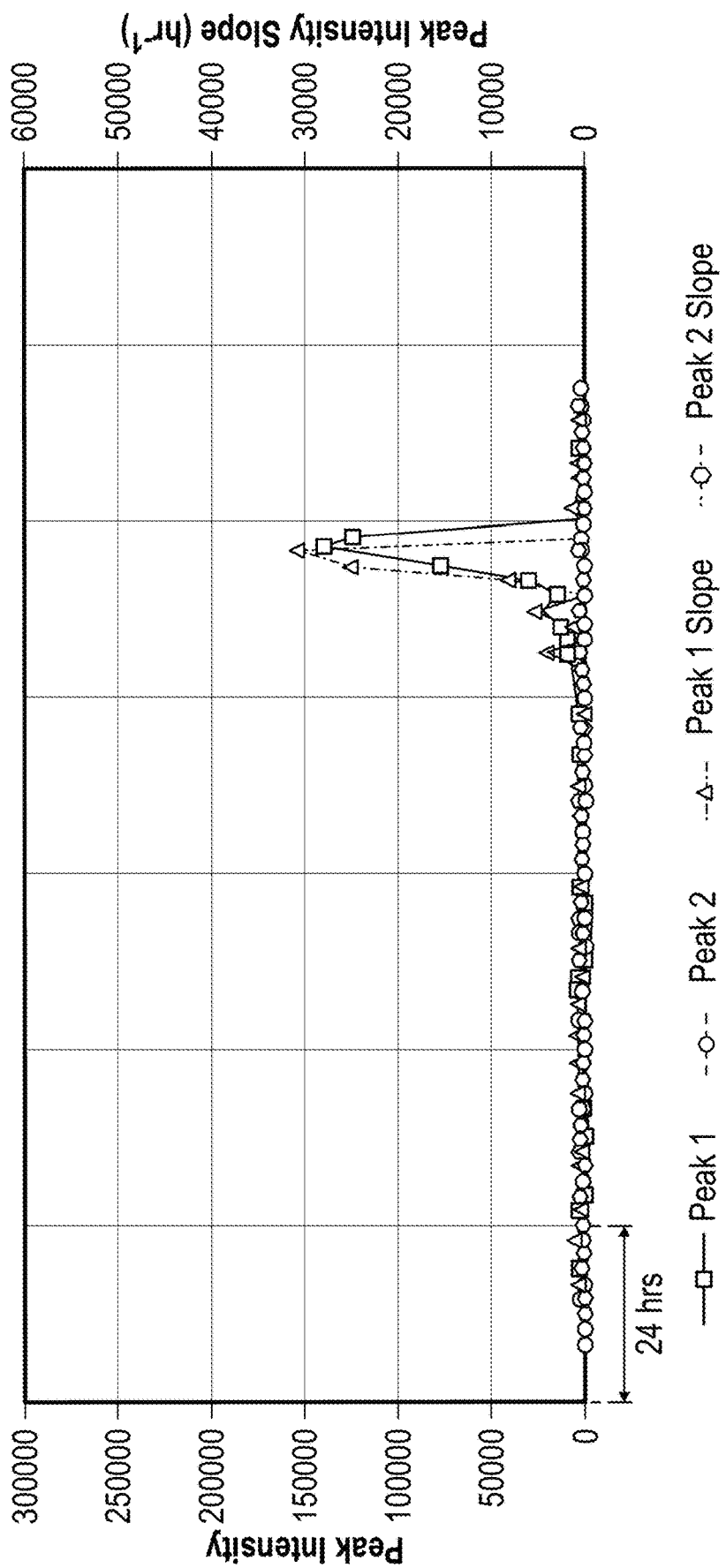

FIG. 7 illustrates the power consumption (kW) over a 20-min time interval for the reactor circulating pump during a fouling event, in which there is clear evidence of periodic variation with a "sawtooth" shape. Similar to Examples 1-2, the power consumption versus time data was converted using frequency analysis (Fourier transform) for the period leading up to and after the fouling event, and the results are shown in FIGS. 8A-8B. In this example, there was a clear and rapid upward trend in periodicity observed in FIG. 8A with the highest intensity primary peak being "Peak 1"—the peak intensity for one-half the average recirculation period. Peak 2, the peak intensity for the average full recirculation period, was not elevated during the entire fouling event. Notably, corrective action was taken and the reactor did not incur a shutdown in Example 3. Similar to FIG. 8A, the rate of change of the peak intensity in FIG. 8B mirrored the peak intensity, and also exhibited a clear and rapid upward trend in periodicity at one-half the average recirculation period.

Example 4

Figure 9:
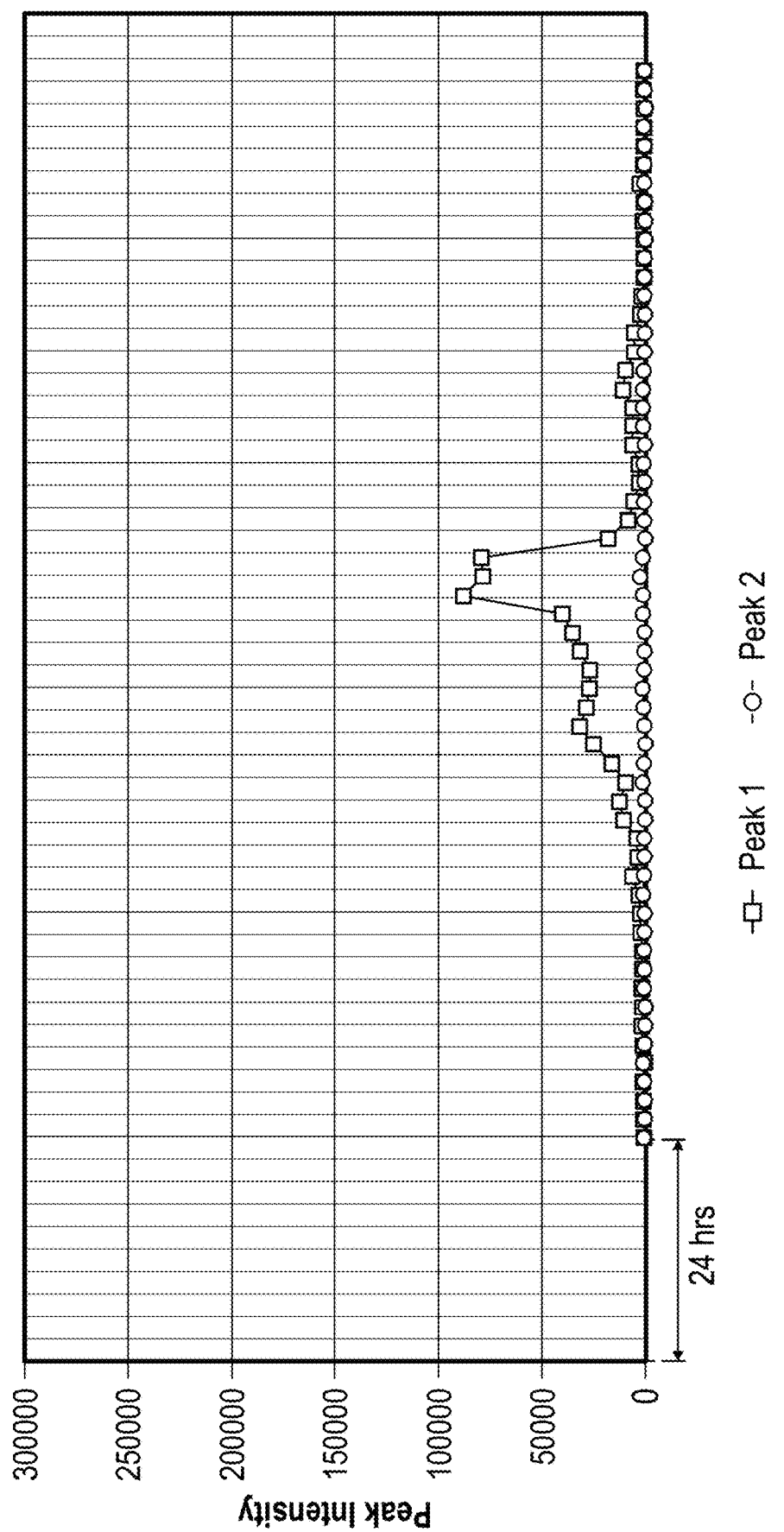
FIG. 9 presents a plot of peak intensity versus time in which intensity versus frequency data at two frequency intervals are included, as described in Example 4.

Similar to the previous examples, FIG. 9 illustrates a plot of peak intensity versus time in which intensity versus frequency data at two frequency intervals are included. In this example, there was a clear and rapid upward trend in periodicity observed with the highest intensity primary peak being "Peak 1"—the peak intensity for one-half the average recirculation period. Peak 2, the peak intensity for the average full recirculation period, was not elevated during the entire fouling event. Similar to Example 3, corrective action was taken and stable reactor operation was restored in Example 4.

Example 5

Figure 10A:
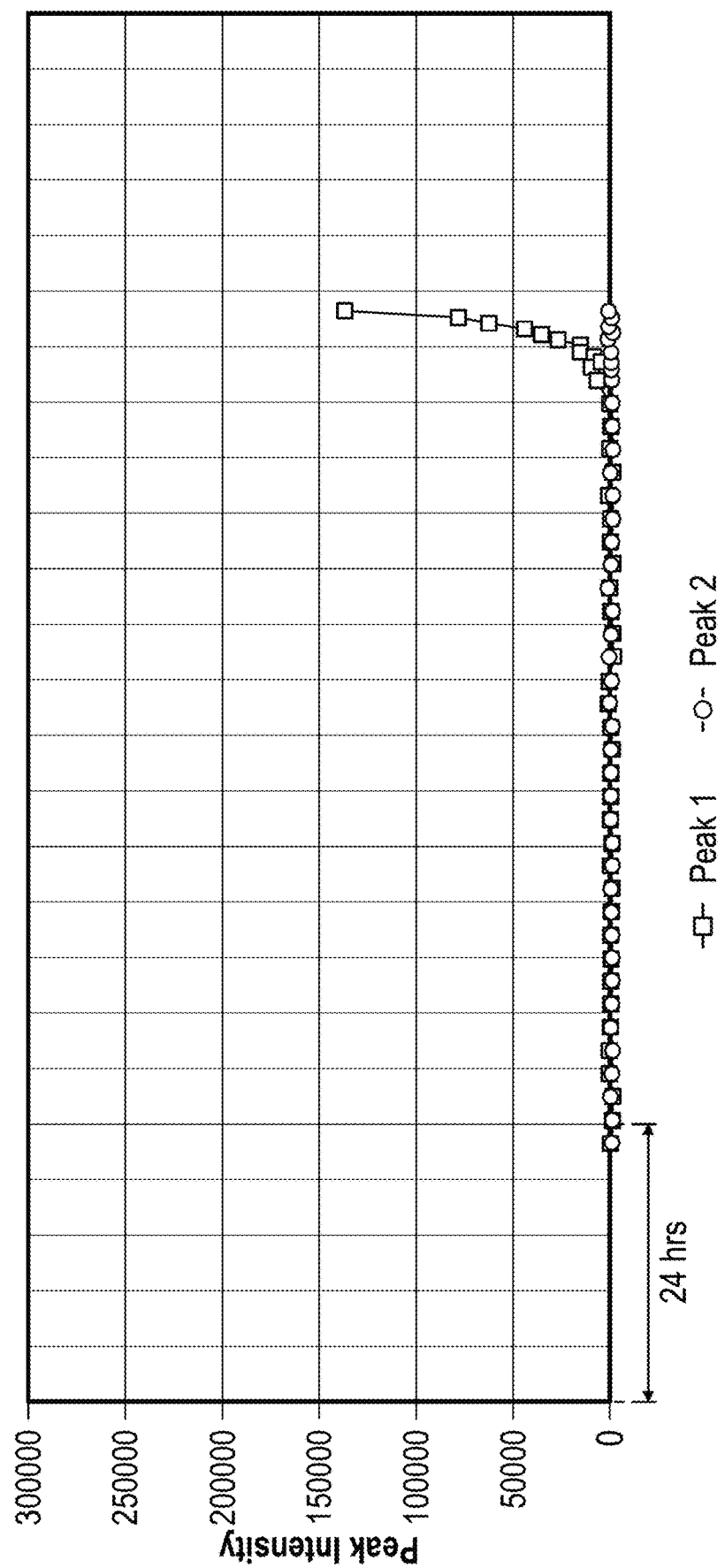
FIG. 10A presents a plot of peak intensity versus time and FIG. 10B presents a plot of peak intensity and the rate of change of peak intensity versus time, in which intensity versus frequency data at two frequency intervals are included, as described in Example 5.
Figure 10B:
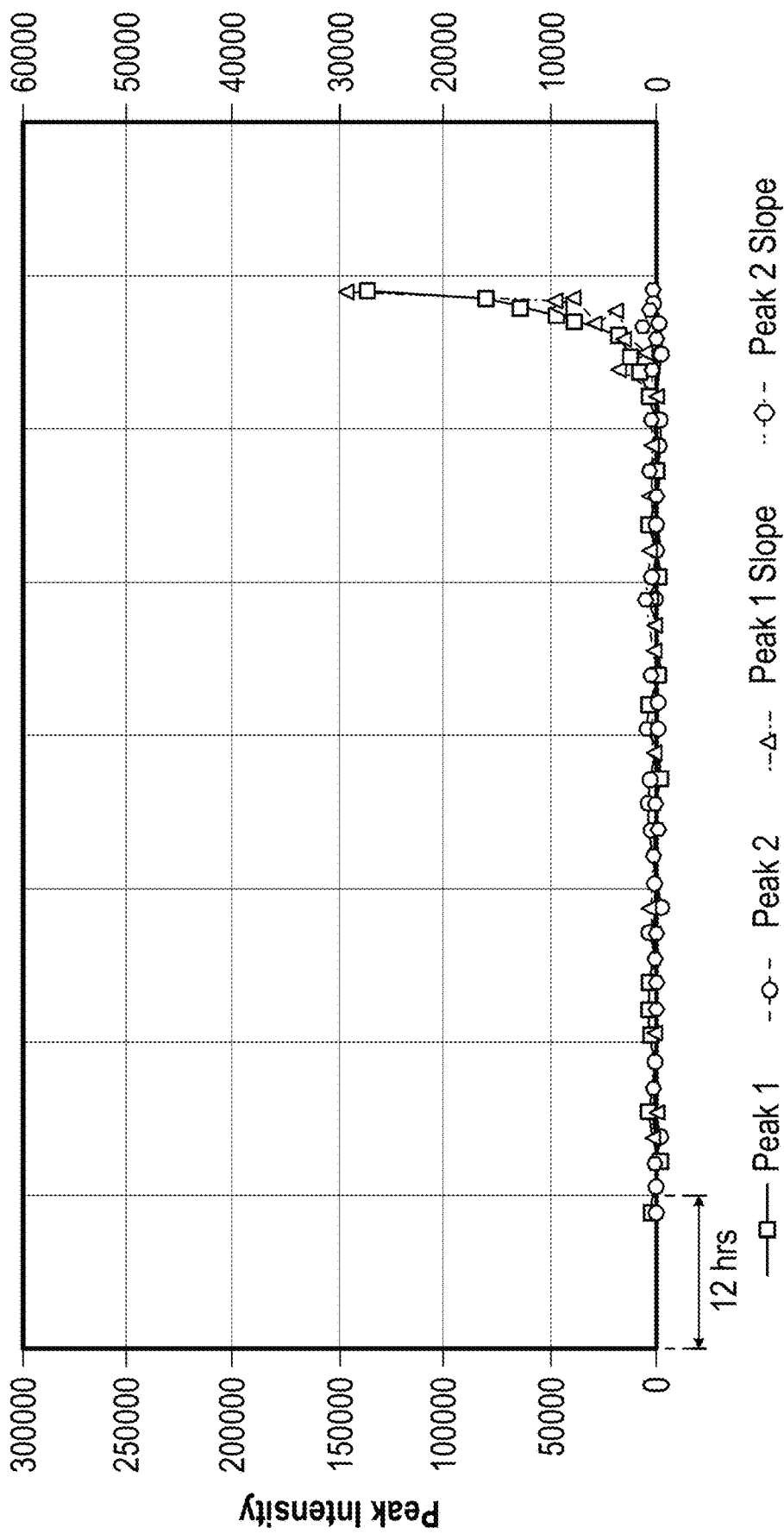

Similar to the previous examples, FIGS. 10A-10B illustrate plots of peak intensity and rate of change of peak intensity versus time in which intensity versus frequency data at two frequency intervals are included. In this example, there was a clear and rapid upward trend in periodicity observed in FIG. 10A with the highest intensity primary peak being "Peak 1"—the peak intensity for one-half the average recirculation period—prior to reactor shutdown. Peak 2, the peak intensity for the average full recirculation period, was not elevated during the entire fouling event. Similarly, the rate of change of the peak intensity (on the right-side y-axis in FIG. 10B) mirrored the peak intensity, and also exhibited a clear and rapid upward trend in periodicity at one-half the average recirculation period.

In sum, Examples 1-5 indicate that it is important to analyze both the first frequency interval (encompassing a time equal to one-half an average recirculation period in the loop slurry reactor) and the second frequency interval (encompassing a time equal to the average full recirculation period in the loop slurry reactor), because only one may be the primary measurable that indicates corrective action must be taken to avoid a reactor foul, process upset, or reactor shutdown.

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of" unless specifically stated otherwise):

Aspect 1. A method of operating a polymerization reactor system, the method comprising:
(i) contacting a transition metal-based catalyst system with an olefin monomer and an optional olefin comonomer in the polymerization reactor system comprising a loop slurry reactor and a reactor circulating pump under polymerization conditions to produce an olefin polymer;
(ii) measuring a kW power consumption of the reactor circulating pump to generate power consumption versus time data;
(iii) converting the power consumption versus time data using frequency analysis to generate (a) intensity versus frequency data at a first frequency interval encompassing a time equal to one-half an average recirculation period in the loop slurry reactor, and (b) intensity versus frequency data at a second frequency interval encompassing a time equal to the average full recirculation period in the loop slurry reactor; and
(iv) reducing a production rate of the olefin polymer in the loop slurry reactor when a total of a first peak intensity at the first frequency interval and a second peak intensity at the second frequency interval is equal to 10,000 or more.

Aspect 2. A method for operating a polymerization reactor system, the method comprising:
(i) contacting a transition metal-based catalyst system with an olefin monomer and an optional olefin comonomer in the polymerization reactor system comprising a loop slurry reactor and a reactor circulating pump under polymerization conditions to produce an olefin polymer;
(ii) measuring a kW power consumption of the reactor circulating pump to generate power consumption versus time data;
(iii) converting the power consumption versus time data using frequency analysis to generate (a) intensity versus frequency data at a first frequency interval encompassing a time equal to one-half an average recirculation period in the loop slurry reactor, and (b) intensity versus frequency data at a second frequency interval encompassing a time equal to the average full recirculation period in the loop slurry reactor; and
(iv) reducing a production rate of the olefin polymer in the loop slurry reactor when a rate of change (or slope) of at least one of a first peak intensity at the first frequency interval and/or a second peak intensity at the second frequency interval is equal to 5,000/hr or more.

Aspect 3. The method defined in aspect 1 or 2, wherein the olefin monomer comprises a $C_2$-$C_{20}$ olefin, or alternatively, wherein the olefin monomer and the olefin comonomer independently comprise a $C_2$-$C_{20}$ alpha-olefin.

Aspect 4. The method defined in any one of aspects 1-3, wherein the olefin monomer comprises ethylene, or alternatively, propylene.

Aspect 5. The method defined in any one of aspects 1-4, wherein the catalyst system is contacted with ethylene and a $C_3$-$C_{10}$ alpha-olefin comonomer.

Aspect 6. The method defined in any one of aspects 1-5, wherein the catalyst system is contacted with ethylene and a comonomer comprising 1-butene, 1-hexene, 1-octene, or a mixture thereof.

Aspect 7. The method defined in any one of aspects 1-6, wherein the olefin polymer comprises an ethylene homopolymer, an ethylene copolymer, a propylene homopolymer, a propylene-based copolymer, or a combination thereof.

Aspect 8. The method defined in any one of aspects 1-6, wherein the olefin polymer comprises an ethylene homopolymer, an ethylene/1-butene copolymer, an ethylene/1-hexene copolymer, an ethylene/1-octene copolymer, or a combination thereof.

Aspect 9. The method defined in any one of aspects 1-6, wherein the olefin polymer comprises an ethylene/1-hexene copolymer.

Aspect 10. The method defined in any one of aspects 1-9, wherein the polymerization reactor system comprises a single loop slurry reactor.

Aspect 11. The method defined in any one of aspects 1-9, wherein the polymerization reactor system comprises two reactors (in series or parallel).

Aspect 12. The method defined in any one of aspects 1-9, wherein the polymerization reactor system comprises more than two reactors.

Aspect 13. The method defined in any one of aspects 1-9, wherein the polymerization reactor system comprises the loop slurry reactor and one or more additional reactors selected from a gas-phase reactor, a solution reactor, a second loop slurry reactor, or any combination thereof.

Aspect 14. The method defined in any one of aspects 1-13, wherein the loop slurry reactor has any suitable volume, e.g., from 15,000 to 100,000 gal, from 25,000 to 100,000 gal, from 25,000 to 75,000 gal, from 40,000 to 100,000 gal, or from 40,000 to 75,000 gal.

Aspect 15. The method defined in any one of aspects 1-14, wherein the loop slurry reactor has any suitable inside diameter, e.g., from 15 to 30 in, from 20 to 30 in, from 24 to 30 in, from 15 to 28 in, from 20 to 28 in, or from 24 to 28 in.

Aspect 16. The method defined in any one of aspects 1-15, wherein the loop slurry reactor has any suitable length, e.g., from 1,000 to 10,000 ft, from 2,000 to 10,000 ft, from 5,000 to 10,000 ft, from 1,000 to 8,000 ft, from 2,000 to 8,000 ft, or from 4,000 to 8,000 ft.

Aspect 17. The method defined in any one of aspects 1-16, wherein the loop slurry reactor has any suitable number of reactor legs, e.g., from 4 to 24, from 8 to 24, from 12 to 24, or 4, 8, 12, 16, 20, or 24.

Aspect 18. The method defined in any one of aspects 1-17, wherein the polymerization reactor system comprises any suitable number of reactor circulating pumps, e.g., from 1 to 6, from 1 to 4, from 1 to 2, or 1, 2, 3, or 4.

Aspect 19. The method defined in any one of aspects 1-18, wherein the transition metal-based catalyst system is a chromium-based catalyst system, a Ziegler-Natta based catalyst system, a metallocene-based catalyst system, or a combination thereof.

Aspect 20. The method defined in any one of aspects 1-19, wherein the transition metal-based catalyst system is a chromium-based catalyst system.

Aspect 21. The method defined in any one of aspects 1-19, wherein the transition metal-based catalyst system is a Ziegler-Natta based catalyst system.

Aspect 22. The method defined in any one of aspects 1-19, wherein the transition metal-based catalyst system is a metallocene-based catalyst system.

Aspect 23. The method defined in any one of aspects 1-22, wherein the transition metal-based catalyst system comprises chromium, vanadium, titanium, zirconium, hafnium, or a combination thereof.

Aspect 24. The method defined in any one of aspects 1-23, wherein the transition metal-based catalyst system comprises a solid oxide.

Aspect 25. The method defined in any one of aspects 1-24, wherein the transition metal-based catalyst system comprises any (one or more) transition metal compound, any (one or more) activator, and optionally any (one or more) co-catalyst disclosed herein.

Aspect 26. The method defined in any one of aspects 1-25, wherein the transition metal-based catalyst system comprises any metallocene catalyst component, any (one or more) activator, and optionally any (one or more) co-catalyst disclosed herein.

Aspect 27. The method defined in any one of aspects 1-25, wherein the catalyst system comprises any (one or more) first metallocene catalyst component, any (one or more) second metallocene catalyst component, any (one or more) activator, and any (one or more) co-catalyst disclosed herein.

Aspect 28. The method defined in aspect 27, wherein the first metallocene catalyst component and the second metallocene catalyst component independently comprise titanium, zirconium, hafnium, or a combination thereof.

Aspect 29. The method defined in any one of aspects 25-28, wherein the activator comprises an aluminoxane compound, an organoboron or organoborate compound, an ionizing ionic compound, an activator-support, or any combination thereof.

Aspect 30. The method defined in any one of aspects 25-29, wherein the activator comprises an aluminoxane compound.

Aspect 31. The method defined in any one of aspects 25-29, wherein the activator comprises an organoboron or organoborate compound.

Aspect 32. The method defined in any one of aspects 25-29, wherein the activator comprises an ionizing ionic compound.

Aspect 33. The method defined in any one of aspects 25-29, wherein the activator comprises an activator-support comprising a solid oxide treated with an electron-withdrawing anion, for example, an activator-support comprising any solid oxide treated with any electron-withdrawing anion disclosed herein.

Aspect 34. The method defined in aspect 33, wherein the activator-support comprises a fluorided solid oxide, a sulfated solid oxide, or a combination thereof.

Aspect 35. The method defined in aspect 33, wherein the activator-support comprises fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided-chlorided silica-coated alumina, fluorided silica-coated alumina, sulfated silica-coated alumina, phosphated silica-coated alumina, or any combination thereof.

Aspect 36. The method defined in aspect 33, wherein the activator-support comprises fluorided alumina, sulfated alumina, fluorided silica-alumina, sulfated silica-alumina, fluorided silica-zirconia, fluorided-chlorided silica-coated alumina, fluorided silica-coated alumina, sulfated silica-coated alumina, or any combination thereof.

Aspect 37. The method defined in any one of aspects 25-36, wherein the catalyst system comprises any organoaluminum co-catalyst disclosed herein.

Aspect 38. The method defined in aspect 37, wherein the organoaluminum co-catalyst comprises trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, or any combination thereof.

Aspect 39. The method defined in aspect 37, wherein the organoaluminum co-catalyst comprises triethylaluminum, triisobutylaluminum, or both.

Aspect 40. The method defined in any one of aspects 1-39, wherein the frequency analysis utilizes a periodogram technique.

Aspect 41. The method defined in any one of aspects 1-39, wherein the frequency analysis utilizes a Fourier transform.

Aspect 42. The method defined in any one of aspects 1-41, wherein step (i), step (ii), step (iii), or any combination thereof, is/are performed continuously.

Aspect 43. The method defined in any one of aspects 1-42, wherein step (ii) is conducted over any suitable time interval, e.g., from 5 min to 1 hr, from 15 min to 45 min, or from 20 min to 40 min.

Aspect 44. The method defined in any one of aspects 1-43, wherein a sampling interval for the power consumption is from 1 to 30 sec, from 1 to 15 sec, or from 5 to 10 sec.

Aspect 45. The method defined in any one of aspects 1-44, wherein reducing the production rate in step (iv) comprises (a) reducing a monomer flow rate into the loop slurry reactor; (b) reducing a comonomer flow rate into the loop slurry reactor; (c) increasing a diluent flow rate into the loop slurry reactor; or (d) any combination thereof.

Aspect 46. The method defined in any one of aspects 1 or 3-45, wherein the production rate is reduced when the total in step (iv) is equal to 12,500 or more, equal to 15,000 or more, equal to 17,500 or more, equal to 20,000 or more, or equal to 30,000 or more.

Aspect 47. The method defined in any one of aspects 1 or 3-46, further comprising, when the total is 40,000 or more, (A) a step of discontinuing monomer addition into the loop slurry reactor; (B) a step of discontinuing catalyst system addition into the loop slurry reactor; (C) a step of introducing a catalyst deactivating agent into the loop slurry reactor to partially or completely terminate a polymerization reaction in the loop slurry reactor; or (D) any combination thereof.

Aspect 48. The method defined in any one of aspects 2-45, wherein the production rate is reduced when the rate of change (or slope) in step (iv) is equal to 6,000/hr or more, equal to 8,000/hr or more, equal to 10,000/hr or more, or equal to 12,500/hr or more.

Aspect 49. The method defined in any one of aspects 2-45 or 48, further comprising, when the rate of change is 15,000 or more, (A) a step of discontinuing monomer addition into the loop slurry reactor; (B) a step of discontinuing catalyst system addition into the loop slurry reactor; (C) a step of introducing a catalyst deactivating agent into the loop slurry reactor to partially or completely terminate a polymerization reaction in the loop slurry reactor; or (D) any combination thereof.

Aspect 50. The method defined in any one of aspects 1-49, wherein the first frequency interval is a time range equal to +/−30% of one-half the average recirculation period in the loop slurry reactor, or +/−25%, or +/−20%, or +/−15%, or +/−10%.

Aspect 51. The method defined in any one of aspects 1-50, wherein the second frequency interval is a time range equal to +/−30% of the average full recirculation period in the loop slurry reactor, or +/−25%, or +/−20%, or +/−15%, or +/−10%.

Aspect 52. The method defined in any one of aspects 1-51, wherein the polymerization conditions comprise a polymerization reaction temperature in a range from 60° C. to 185° C., from 60° C. to 115° C., or from 130° C. to 180° C., and any suitable reaction pressure, e.g., from 200 to 1000 psig.

Aspect 53. The method defined in any one of aspects 1-52, wherein the polymerization conditions are substantially constant, for example, for a particular polymer grade.

Aspect 54. The method defined in any one of aspects 1-53, wherein hydrogen is added to the polymerization reactor system.

Aspect 55. The method defined in any one of aspects 1-53, wherein no hydrogen is added to the polymerization reactor system.

Aspect 56. The method defined in any one of aspects 1-55, wherein a melt index (MI) of the olefin polymer is in any range disclosed herein, e.g., from 0 g/10 min to 25 g/10 min, from 0 g/10 min to 1 g/10 min, or from 0.1 g/10 min to 2 g/10 min.

Aspect 57. The method defined in any one of aspects 1-56, wherein a weight-average molecular weight (Mw) of the olefin polymer is in any range disclosed herein, e.g., from 50,000 g/mol to 1,000,000 g/mol, from 100,000 g/mol to 750,000 g/mol, or from 100,000 g/mol to 350,000 g/mol.

Aspect 58. The method defined in any one of aspects 1-57, wherein a density of the olefin polymer is in any range disclosed herein, e.g., from 0.88 g/cc to 0.97 g/cc, from 0.91 g/cc to 0.96 g/cc, or from 0.92 g/cc to 0.95 g/cc.

We claim:

1. A method of operating a polymerization reactor system, the method comprising:
   (i) contacting a transition metal-based catalyst system with an olefin monomer and an optional olefin comonomer in the polymerization reactor system comprising a loop slurry reactor and a reactor circulating pump under polymerization conditions to produce an olefin polymer;
   (ii) measuring a kW power consumption of the reactor circulating pump to generate power consumption versus time data;
   (iii) converting the power consumption versus time data using frequency analysis to generate (a) intensity versus frequency data at a first frequency interval encompassing a time equal to one-half an average recirculation period in the loop slurry reactor, and (b) intensity versus frequency data at a second frequency interval encompassing a time equal to the average full recirculation period in the loop slurry reactor; and
   (iv) reducing a production rate of the olefin polymer in the loop slurry reactor when a total of a first peak intensity at the first frequency interval and a second peak intensity at the second frequency interval is equal to 10,000 or more.

2. The method of claim 1, wherein the production rate is reduced when the total in step (iv) is equal to 15,000 or more.

3. The method of claim 1, wherein reducing the production rate in step (iv) comprises:
(a) reducing a monomer flow rate into the loop slurry reactor;
(b) reducing a comonomer flow rate into the loop slurry reactor;
(c) increasing a diluent flow rate into the loop slurry reactor; or
(d) any combination thereof.

4. The method of claim 1, wherein:
the first frequency interval is a time range equal to +/−30% of one-half the average recirculation period in the loop slurry reactor; and
the second frequency interval is a time range equal to +/−30% of the average full recirculation period in the loop slurry reactor.

5. The method of claim 4, wherein the production rate is reduced when the total in step (iv) is equal to 20,000 or more.

6. The method of claim 1, when the total in step (iv) is equal to 40,000 or more, further comprising:
(A) a step of discontinuing monomer addition into the loop slurry reactor;
(B) a step of discontinuing catalyst system addition into the loop slurry reactor;
(C) a step of introducing a catalyst deactivating agent into the loop slurry reactor to partially or completely terminate a polymerization reaction in the loop slurry reactor; or
(D) any combination thereof.

7. The method of claim 1, wherein the olefin monomer comprises ethylene or propylene.

8. The method of claim 1, wherein the catalyst system is contacted with ethylene and a comonomer comprising 1-butene, 1-hexene, 1-octene, or a mixture thereof.

9. The method of claim 1, wherein the polymerization reactor system comprises a single loop slurry reactor.

10. The method of claim 1, wherein the polymerization reactor system comprises the loop slurry reactor and one or more additional reactors selected from a gas-phase reactor, a solution reactor, a second loop slurry reactor, or any combination thereof.

11. The method of claim 1, wherein:
the transition metal-based catalyst system is a chromium-based catalyst system, a Ziegler-Natta based catalyst system, a metallocene-based catalyst system, or a combination thereof; and
the olefin polymer comprises an ethylene homopolymer, an ethylene/1-butene copolymer, an ethylene/1-hexene copolymer, an ethylene/1-octene copolymer, or a combination thereof.

12. The method of claim 1, wherein the transition metal-based catalyst system comprises a metallocene compound, an activator, and an optional co-catalyst.

13. The method of claim 12, wherein the activator comprises an aluminoxane compound, an organoboron or organoborate compound, an ionizing ionic compound, an activator-support, or any combination thereof.

14. The method of claim 12, wherein:
the catalyst system comprises the co-catalyst, and the co-catalyst comprises an organoaluminum compound; and
the activator comprises a fluorided solid oxide, a sulfated solid oxide, or a combination thereof.

15. The method of claim 1, wherein:
step (ii) is conducted over a time period from 5 min to 1 hr; and
a sampling interval for the power consumption is from 1 to 30 sec.

16. A method of operating a polymerization reactor system, the method comprising:
(i) contacting a transition metal-based catalyst system with an olefin monomer and an optional olefin comonomer in the polymerization reactor system comprising a loop slurry reactor and a reactor circulating pump under polymerization conditions to produce an olefin polymer;
(ii) measuring a kW power consumption of the reactor circulating pump to generate power consumption versus time data;
(iii) converting the power consumption versus time data using frequency analysis to generate (a) intensity versus frequency data at a first frequency interval encompassing a time equal to one-half an average recirculation period in the loop slurry reactor, and (b) intensity versus frequency data at a second frequency interval encompassing a time equal to the average full recirculation period in the loop slurry reactor; and
(iv) reducing a production rate of the olefin polymer in the loop slurry reactor when a rate of change of at least one of a first peak intensity at the first frequency interval and/or a second peak intensity at the second frequency interval is equal to 5,000/hr or more.

17. The method of claim 16, wherein the catalyst system is contacted with ethylene and a $C_3$-$C_{10}$ alpha-olefin comonomer.

18. The method of claim 16, wherein the production rate is reduced when the rate of change in step (iv) is equal to 8,000/hr or more.

19. The method of claim 16, wherein:
the first frequency interval is a time range equal to +/−30% of one-half the average recirculation period in the loop slurry reactor;
the second frequency interval is a time range equal to +/−30% of the average full recirculation period in the loop slurry reactor; and
the production rate is reduced when the rate of change in step (iv) is equal to 10,000/hr or more.

20. The method of claim 16, wherein:
the transition metal-based catalyst system is a chromium-based catalyst system, a Ziegler-Natta based catalyst system, a metallocene-based catalyst system, or a combination thereof; and
the olefin polymer comprises an ethylene homopolymer, an ethylene/1-butene copolymer, an ethylene/1-hexene copolymer, an ethylene/1-octene copolymer, or a combination thereof.

21. The method of claim 16, wherein reducing the production rate in step (iv) comprises:
(a) reducing a monomer flow rate into the loop slurry reactor;
(b) reducing a comonomer flow rate into the loop slurry reactor;
(c) increasing a diluent flow rate into the loop slurry reactor; or
(d) any combination thereof.

22. The method of claim 16, wherein the polymerization reactor system comprises a single loop slurry reactor.

23. The method of claim 16, wherein the polymerization reactor system comprises the loop slurry reactor and one or more additional reactors selected from a gas-phase reactor, a solution reactor, a second loop slurry reactor, or any combination thereof.

24. The method of claim 16, wherein the production rate is reduced when the rate of change in step (iv) is equal to 10,000/hr or more.

25. The method of claim 16, when the rate of change is 15,000 or more, further comprising:
   (A) a step of discontinuing monomer addition into the loop slurry reactor;
   (B) a step of discontinuing catalyst system addition into the loop slurry reactor;
   (C) a step of introducing a catalyst deactivating agent into the loop slurry reactor to partially or completely terminate a polymerization reaction in the loop slurry reactor; or
   (D) any combination thereof.

* * * * *